US010584003B2

(12) United States Patent
Friesen

(10) Patent No.: US 10,584,003 B2
(45) Date of Patent: Mar. 10, 2020

(54) PORTABLE DRIVE-OVER CONVEYOR SYSTEM USABLE FOR UNLOADING BELLY DUMP TRUCKS WITH MULTIPLE DISCHARGES AND FOR SIMULTANEOUSLY UNLOADING MORE THAN ONE TRUCK

(71) Applicant: Hi-Crush Canada Inc., Houston, TX (US)

(72) Inventor: Henry Friesen, Winkler (CA)

(73) Assignee: Hi-Crush Canada Inc., Houston, TX (US)

( * ) Notice: Subject to any disclaimer, the term of this patent is extended or adjusted under 35 U.S.C. 154(b) by 0 days.

(21) Appl. No.: 15/486,801

(22) Filed: Apr. 13, 2017

(65) Prior Publication Data

US 2017/0297835 A1    Oct. 19, 2017

Related U.S. Application Data

(63) Continuation-in-part of application No. 15/130,201, filed on Apr. 15, 2016, now Pat. No. 9,975,712.

(51) Int. Cl.
| B65G 67/24 | (2006.01) |
| B65G 47/20 | (2006.01) |
| B65G 47/44 | (2006.01) |

(52) U.S. Cl.
CPC ............ *B65G 67/24* (2013.01); *B65G 47/20* (2013.01); *B65G 47/44* (2013.01)

(58) Field of Classification Search
CPC ...... B65G 11/146; B65G 47/20; B65G 47/44; B65G 47/58; B65G 67/24
USPC ......................................... 414/376, 573, 574
See application file for complete search history.

(56) References Cited

U.S. PATENT DOCUMENTS

| 3,606,050 A | * | 9/1971 | Silver | B65G 69/30 198/607 |
| 4,669,674 A | * | 6/1987 | Oldengott | B65G 67/24 222/163 |
| 4,701,095 A | * | 10/1987 | Berryman | B65D 88/30 198/311 |
| 5,297,914 A | * | 3/1994 | Ash | B65G 67/24 180/298 |

(Continued)

FOREIGN PATENT DOCUMENTS

EP    0336815 A1 * 10/1989 ............. B65D 88/28

*Primary Examiner* — James Keenan
(74) *Attorney, Agent, or Firm* — Baker Botts L.L.P.

(57) ABSTRACT

A portable drive-over conveyor is provided with a plurality of inlets and first and second conveyors so as to be arranged for simultaneously unloading multiple trucks side by side. Furthermore, the portable drive-over conveyor may be used in a system with another such drive-over conveyor in parallel to unload a truck having multiple discharges at each of the discharges by forming a bridge in between center structures of the drive-over conveyors allowing the truck to cross over the side by side drive-over conveyors and position the multiple discharges over the inlets of the side by side conveyors. Moreover, the second conveyor is swivably mountable on a frame of the drive-over conveyor such that particulate material is dischargeable at different locations angularly of a longitudinal axis of the trailer. The portable drive-over conveyor includes other novel features which are usable on a drive-over conveyor of the same type having at least one inlet.

19 Claims, 26 Drawing Sheets

(56) References Cited

U.S. PATENT DOCUMENTS

| | | | | |
|---|---|---|---|---|
| 5,785,481 A * | 7/1998 | Ockels | B60P 1/42 | 222/1 |
| 5,964,566 A * | 10/1999 | Stewart | B65G 67/24 | 198/302 |
| 6,966,740 B2 * | 11/2005 | Mast | B65G 47/18 | 414/537 |
| 7,090,066 B2 * | 8/2006 | Kirsch | B65G 47/18 | 198/302 |
| 7,424,943 B2 * | 9/2008 | Gausman | B65G 67/24 | 198/311 |
| 7,695,049 B2 * | 4/2010 | Colborne | B60P 3/14 | 135/88.13 |
| 9,278,237 B2 * | 3/2016 | Cook | A62C 27/00 | |
| 9,394,657 B2 * | 7/2016 | Groeneweg | E01F 15/148 | |
| 9,663,303 B2 * | 5/2017 | Waldner | B65G 17/126 | |
| 9,957,108 B2 * | 5/2018 | Ho | B65G 11/126 | |
| 10,414,319 B2 * | 9/2019 | Friesen | B65G 67/24 | |
| 10,457,486 B1 * | 10/2019 | Ulmer | B65G 47/20 | |
| 2010/0135758 A1 * | 6/2010 | Gallione | B60P 1/36 | 414/505 |
| 2012/0219391 A1 * | 8/2012 | Teichrob | B65G 63/008 | 414/293 |
| 2013/0233682 A1 * | 9/2013 | Werlinger | B65G 21/10 | 198/861.2 |
| 2015/0044004 A1 * | 2/2015 | Pham | B65D 88/32 | 414/332 |
| 2016/0052732 A1 * | 2/2016 | Toews | B65G 47/18 | 198/302 |
| 2018/0072516 A1 * | 3/2018 | Storm | B65G 65/42 | |

* cited by examiner

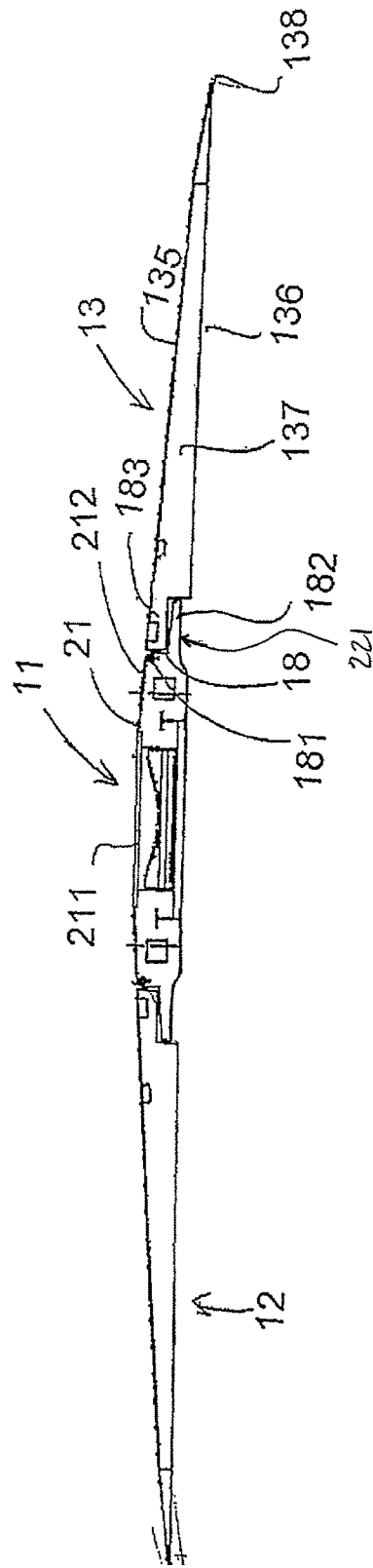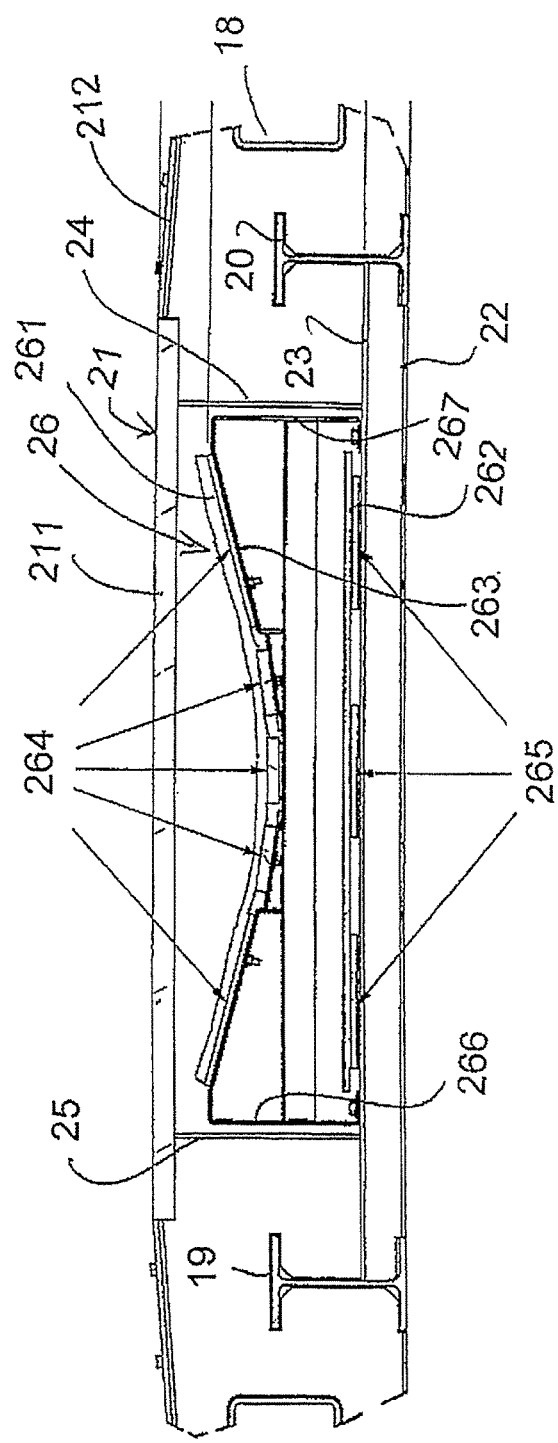

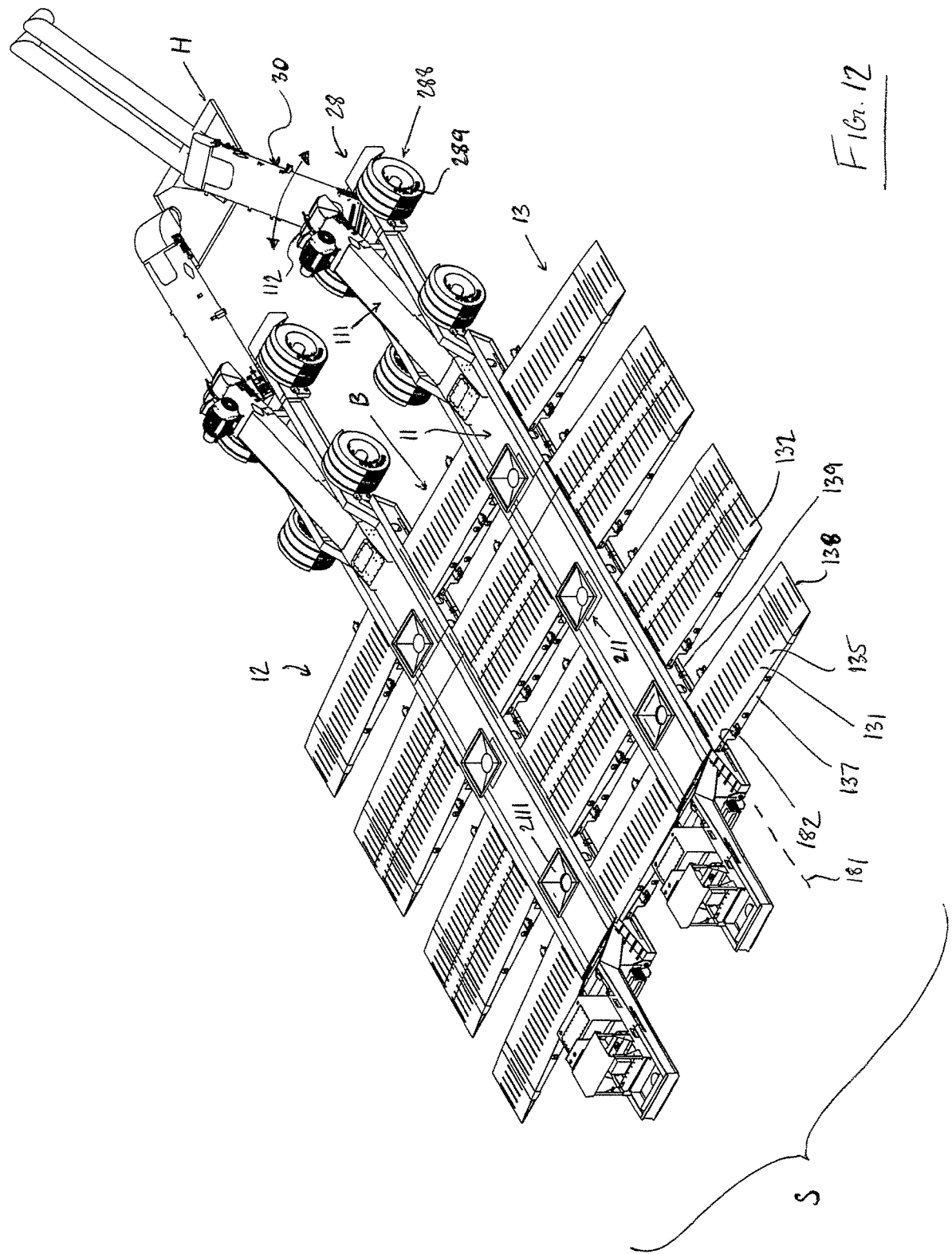

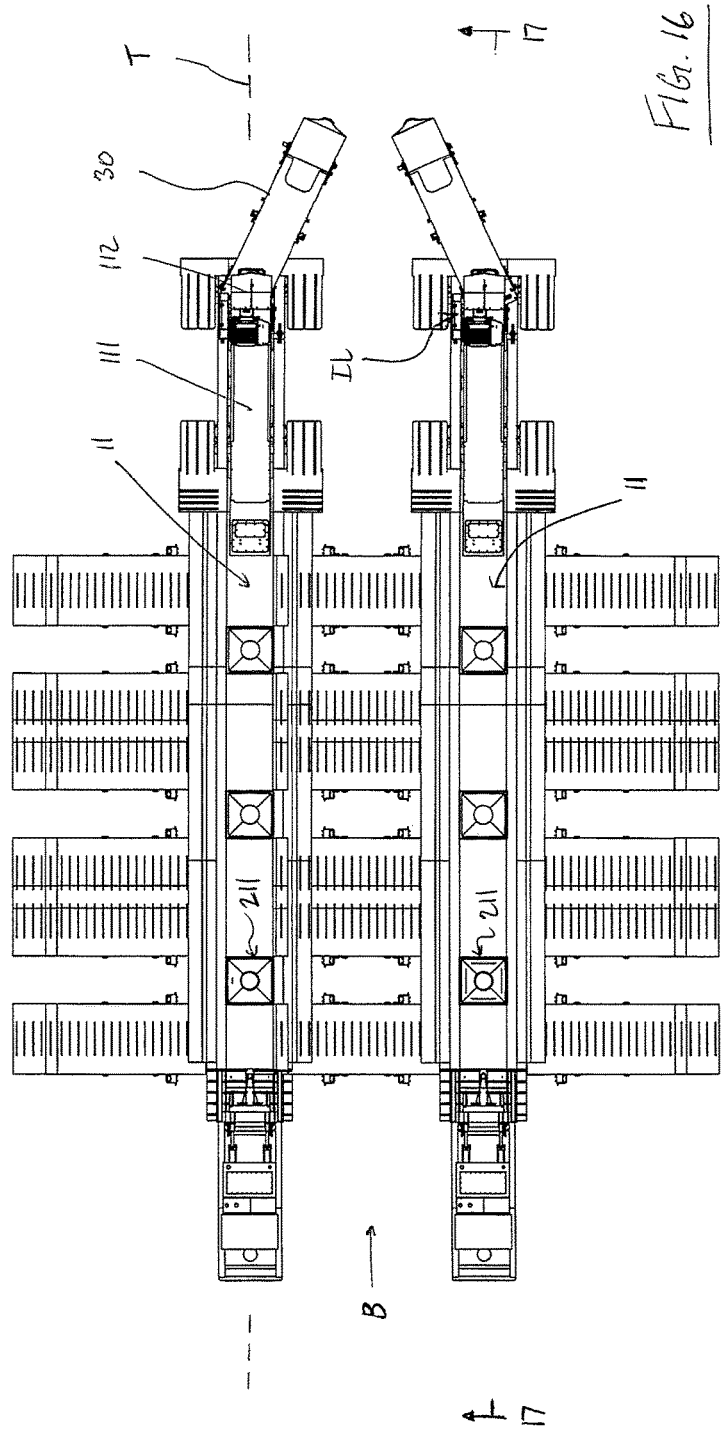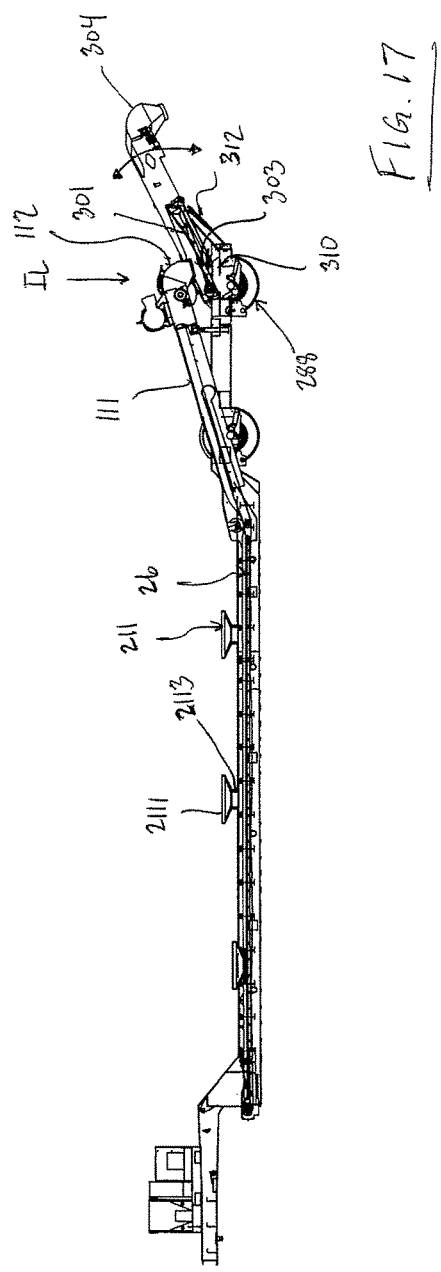
FIG. 16
FIG. 17

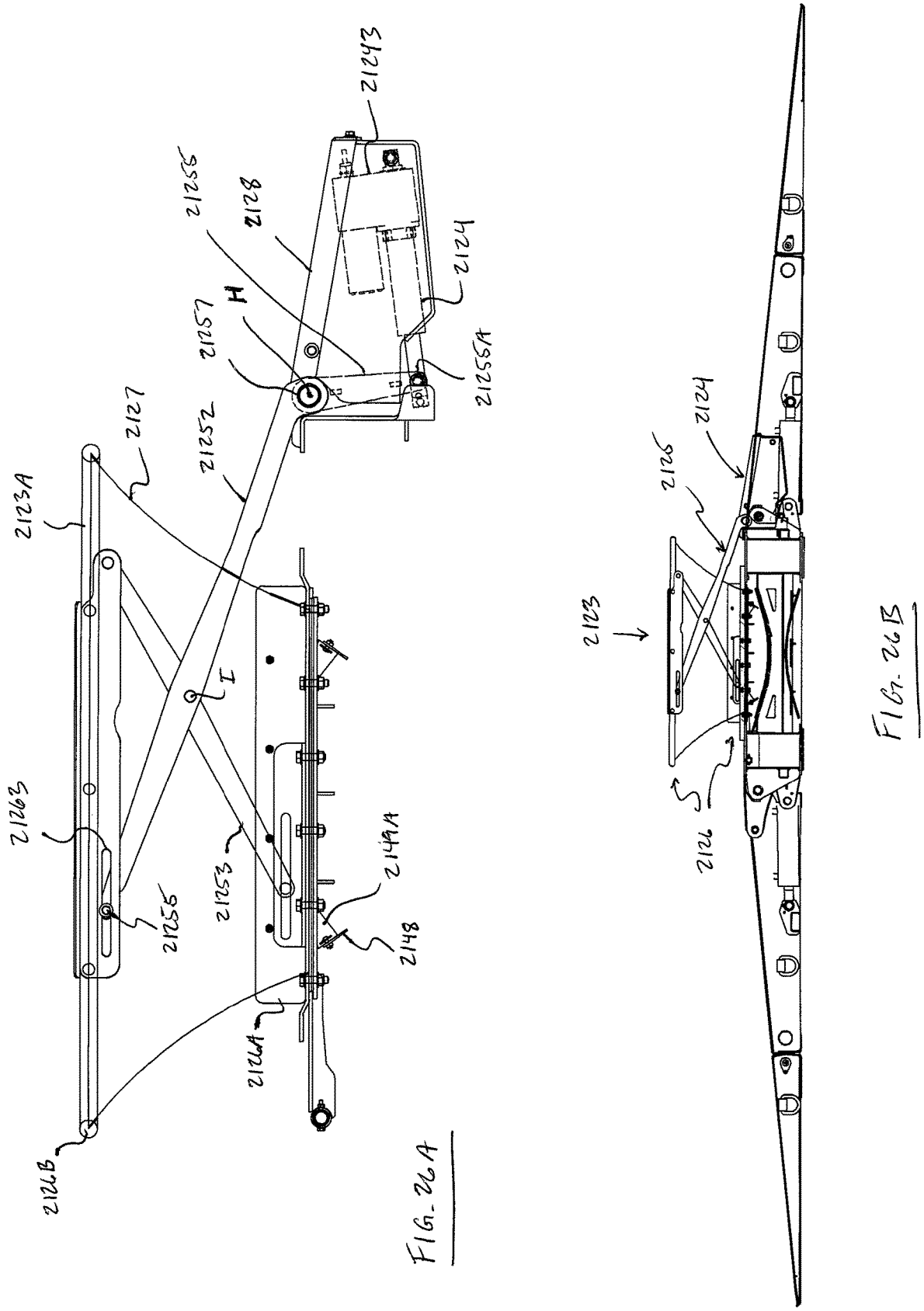

PORTABLE DRIVE-OVER CONVEYOR SYSTEM USABLE FOR UNLOADING BELLY DUMP TRUCKS WITH MULTIPLE DISCHARGES AND FOR SIMULTANEOUSLY UNLOADING MORE THAN ONE TRUCK

This application is a continuation-in-part of U.S. parent application Ser. No. 15/130,201 filed Apr. 15, 2016.

FIELD OF THE INVENTION

The present invention relates to a portable drive-over conveyor for unloading trucks.

BACKGROUND

A number of portable drive-over conveyors are presently provided by various manufacturers which can be used to unload a dump truck of its particulate material contents, for example aggregate.

These portable drive-over conveyors are particularly suited for use in a manner accommodating only dump trucks with a single discharge whether it be of the end dump or belly dump/bottom dump style, and thus only such use may have been contemplated therefor. As such, dump trucks having multiple discharges (typically of the belly dump style) require more time to unload their contents using the forgoing drive-over conveyors as this unloading process is likely to include one of (i) positioning each discharge one at a time over the portable drive-over conveyor, or (ii) discharging all contents through a single discharge.

Furthermore, such presently available portable drive-over conveyors are particularly suited for use in a manner accommodating only one dump truck at a time for unloading, so a series of dump trucks collectively transporting particulate material are required to be unloaded sequentially of one another thereby significantly increasing the duration of the unloading operation.

It thus may be desirable to have a system for unloading trucks which have multiple discharges, and that may also be suitable for unloading two or more trucks simultaneously. It additionally may be desirable to have an improved drive-over conveyor for unloading trucks that is towable on a paved roadway such as a highway so as to be movable from one location to the next.

SUMMARY OF THE INVENTION

According to an aspect of the invention there is provided a portable drive-over conveyor for unloading particulate material from trucks comprising:

a trailer having a frame structure with front and rear ends opposite one another on a trailer axis and first and second sides spanning between the forward and rear ends longitudinally of said trailer axis where the front end, rear end, left side, and right side collectively define a periphery of the frame;

the trailer including a hitch coupling supported at the front end of the frame structure for coupling to a towing vehicle;

the trailer including a plurality of wheels rotatably coupled at the rear end of the frame structure such that the trailer is towable across a support surface by the towing vehicle;

a conveyor carried by the frame structure and extending longitudinally of the trailer axis from one end to another end of the trailer;

the conveyor being arranged to transport particulate material to a discharge at one end of the trailer;

a first ramp assembly mounted on the first side for pivotal movement about an axis longitudinal of the first side such that the first ramp assembly is positionable in a manner extending outwardly from the first side to define a ramp allowing a truck wheel to move onto the frame structure from another surface;

a second ramp assembly mounted on the second side for pivotal movement about an axis longitudinal of the second side such that the second ramp assembly is positionable in a manner extending outwardly from the second side to define a ramp allowing a truck wheel to move onto the frame structure from another surface;

the ramp assemblies and the frame structure providing upper surfaces for supporting the truck as it passes from the first ramp assembly over the frame structure and onto the second ramp assembly;

the upper surface of the frame structure including at least one inlet for passage of the particulate material discharged thereon through the upper surface to the conveyor.

According to an aspect of the invention there is provided a method for unloading particulate material from trucks having a plurality of discharges at longitudinally spaced positions therealong comprising:

providing at least two portable drive-over conveyors respectively comprising:
  a trailer including a center frame structure with forward and rearward ends and first and second sides;
  the trailer including a hitch coupling arranged at the forward end of the center frame structure for coupling to a towing vehicle;
  the trailer including a wheel and axle assembly arranged at the rearward end such that the trailer is towable across a support surface by the towing vehicle;
  a first ramp assembly mounted on the first side for pivotal movement about an axis longitudinal of the first side such that the first ramp assembly is positionable in a manner extending outwardly from the first side to define a ramp allowing a truck wheel to move onto the center frame structure from another surface;
  a second ramp assembly mounted on the second side for pivotal movement about an axis longitudinal of the second side such that the second ramp assembly is positionable in a manner extending outwardly from the second side to define a ramp allowing a truck wheel to move onto the center frame structure from another surface;
  a conveyor arranged along the center frame structure and arranged to transport the particulate material longitudinally along the trailer to a discharge at one end of the center frame structure;
  the ramp assemblies and the center frame structure providing upper surfaces for supporting the truck as it passes from the first ramp assembly over the center frame structure and onto the second ramp assembly;
  the upper surface of the center frame structure having an inlet for passage of the particulate material discharged thereon through the upper surface to the conveyor;

arranging said at least two portable drive-over conveyors such that one of the sides of a first one of the portable drive-over conveyors is facing one of the sides of a second one of the portable drive-over conveyors;

positioning one of the ramp assemblies of each of the portable drive-over conveyors in an overlapping configuration with one ramp assembly disposed on top of the other so as to form a bridge allowing a truck wheel to cross from the center frame structure of one portable drive-over conveyor to the other;

arranging a truck to pass over said at least two portable drive-over conveyors such that respective discharges of the truck are arranged over the inlet of each portable drive-over conveyor for discharging the particulate material to the conveyors;

and transporting the particulate material along the conveyors to another location beyond the portable drive-over conveyors.

This system thus provides at least two trailers each with two sets of ramp assemblies for moving to and from a respective unload point of the respective portable drive-over conveyor.

The portable drive-over conveyors may thus be operated in parallel to simultaneously unload a truck at each one of its multiple discharges.

Typically the portable drive-over conveyors are arranged spaced apart so that a distance between their inlets is in the order of spacing between the discharges of the truck.

In one arrangement the portable drive-over conveyor comprises a plurality of the inlets. Typically these are arranged at spaced positions longitudinally of the frame structure.

In this arrangement a plurality of trucks are unloadable at the same time. Thus a single such portable drive-over conveyor may by itself be used to unload two or more trucks side by side. Additionally, in the side-by-side parallel unloading arrangement, multiple trucks each with multiple discharges may be unloaded simultaneously.

The truck may be a belly dump truck.

In one arrangement the conveyors of said at least two portable drive-over conveyors feed the particulate material directly to a common location.

An important independent optional feature is that the ramp assemblies each include a pair of ramp members arranged in spaced configuration in front of and to the rear of each inlet, and the ramp members immediately adjacent to one another but belonging to different pairs are unitary.

Another important independent optional feature is that there is provided a partition wall upstanding from the upper surface of the frame structure between respective ones of each adjacent pair of the inlets such that the upper surface of the frame structure is divided into separate lanes each for receiving one of the trucks.

Another important independent optional feature is that there is provided in the partition wall on either side thereof a light which is arranged to illuminate an area of the upper surface of the frame structure including a respective one of said each adjacent pair of the inlets. This allows unloading operations to be performed safely when it is dark around the portable drive-over conveyor.

Another important independent optional feature is that the conveyor includes a first conveyor portion which is fed by said at least one inlet and which extends rearwardly past said at least one inlet to an intermediary location, and a second conveyor portion extending from the intermediary location to the discharge of the conveyor. Thus when the portable drive-over conveyor includes the plurality of inlets the first conveyor portion extends rearwardly of a rearmost one of the inlets to the intermediary location.

As such, typically the second conveyor portion is fed by the first conveyor portion which at the intermediary location has a discharge positionable over an inlet of the second conveyor portion.

Another important independent optional feature is that the inlet of the second conveyor portion includes an upstanding annular wall delimiting an opening through which the particulate material is fed and the discharge of the first conveyor portion includes a depending inner annular wall delimiting an opening through which the particulate material is discharged and a depending outer annular wall spaced radially outwardly of the inner annular wall receiving therebetween the annular wall of the inlet of the second conveyor portion when said discharge is positioned over said inlet thereby forming a seal at the intermediary location. The outer annular wall of the first conveyor portion acts to cover the intermediary location during exchange of the particulate material between the first and second conveyor portions so as to reduce propagation of dust therefrom that otherwise may lead to diseases such as silicosis in users/operators of the portable drive-over conveyors.

Another important independent optional feature is that the second conveyor portion is swivably attached to the frame structure so as to be swivably movable about an upstanding axis such that the discharge of the conveyor is locatable to either side of the trailer axis.

Another important independent optional feature is that the second conveyor portion is positionable in a working position where the discharge of the conveyor is located beyond the periphery of the trailer and in a transport position where the second conveyor portion lies within the periphery of the trailer.

In one arrangement, in the transport position the second conveyor portion is disposed above the first conveyor portion where the second conveyor portion is inoperable for receiving the particulate material transferred by the first conveyor portion.

Another important independent optional feature is that the inlet of at least one of the portable drive-over conveyors includes a funnel structure and a neck extending downwardly from a bottom of the funnel structure such that the funnel structure is arranged for raising above the upper surface of the center frame structure towards the respective discharge of the truck located thereover.

The raising funnel structure may thus be positioned closer to the respective discharge of the truck so as to capture as close to all of the particulate material discharged therefrom.

In other words, at the inlet there may be provided a chute with a top which is liftable to a position spaced above the upper surface of the frame structure so as to capture and guide onto the conveyor the particulate material discharged thereon at a location spaced above the upper surface of the frame structure.

Another important independent optional feature is that the chute includes an actuator operatively connected to the top of the chute for lifting the top of the chute and the actuator is arranged to one side of the frame structure such that the top of the chute is lowerable to a position at the upper surface of the frame structure. This is important so as to minimize a height of the center frame structure to prevent the respective truck with trailer or container from which the particulate material is unloaded from bottoming or grounding out on the frame structure as the truck is positioned for unloading.

Another important independent optional feature is that the inlet there is provided a cover spanning thereacross with apertures and a component which is positionable so as to close said apertures to prevent the particulate material from falling onto the conveyor.

Another important independent optional feature is that the component comprises a sheet with a set of apertures matching that of the cover that are positionable to be misaligned relative to the apertures of the cover thereby preventing the particulate material from falling onto the conveyor.

Another important independent optional feature is that the cover between respective ones of each adjacent pair of the apertures comprises a pair of inclined surfaces meeting at a tip spaced above the apertures such that the inclined surfaces act to guide the particulate material into one of the apertures.

Another important independent optional feature is that at least one of the first and the second ramp assemblies includes a ramp member with a first ramp section defining an outer end of the ramp member that is pivotally coupled at a joint to a second ramp section pivotally connected to the frame structure such that at the joint the first ramp section is pivotal relative to the second ramp section about an axis parallel to that which is longitudinal of a respective one of the sides of the frame structure. This allows a bottom of the ramp member to follow as closely possible that surface upon which the ramp member is rested in the lowered/operating position, whether that be the upper surface of the ramp member of another portable drive-over conveyor as when ramp members form the bridge between a pair of adjacent drive-over conveyors to be operated in parallel or a ground surface on which portable drive-over conveyor is located during the unloading operation, thereby reducing stress on the ramp member when the truck wheel moves across same.

Another important independent optional feature is that the first ramp section includes an arcuate surface at the joint that is curved convexly of the first ramp section. The arcuate surface, which for example comprises edges on opposing sides of the ramp member at an end of the first ramp section that is opposite the outer end of the ramp member and thus proximal the joint, grants a prescribed range for pivotal movement of the first ramp section relative to the second ramp section with end portions of the arcuate surface acting to abut a proximal end of the second ramp section at the joint at an end of the pivotal range.

Another important independent optional feature is that the second ramp section includes a stepped surface at the joint for abutting an end of the first ramp section opposite that defining the outer end of the ramp member where a first portion of the stepped surface adjacent the upper surface of the respective one of at least one of the first and second ramp assemblies is projecting beyond a second portion distal to said upper surface.

The stepped surface may transition from the first portion to the second portion at a location spaced from that location on the stepped surface corresponding to an apex of the arcuate surface of the first ramp section.

Therefore, from an angularly neutral position of the first ramp section relative to the second ramp section when bottoms thereof follow a common linear path so as to be linearly aligned, the first portion of the stepped surface acts to form a smaller pivotal range of movement from the angularly neutral position than that provided by the second portion of the stepped surface.

Another important independent optional feature is that the respective portable drive-over conveyor includes a controller for controlling operation of the conveyor.

For example, the controller includes a control panel mounted rearwardly of a rearmost one of said at least one inlet so as to be at a location intermediate said rearmost inlet and the discharge of the conveyor so that both are visible by an operator positioned in front of the control panel.

Another important independent optional feature is that the controllers of said at least two portable drive-over conveyors are operatively coupled so that the conveyors of said at least two portable drive-over conveyors are operated from the controller of one of said at least two portable drive-over conveyors in the step of transporting the particulate material along the conveyors. This allows for a single operator positioned in a safe location at one of the portable drive-over conveyors to operate multiple conveyors.

For example the controllers are operatively coupled for operation from one thereof via a cable.

Another important independent optional feature is that the portable drive-over conveyor includes a light pole which is movable from a transport position in which the pole is horizontally oriented adjacent the frame structure to a working position in which the light pole is upstanding therefrom.

This light pole may be disposed in an intermediate location rearwardly of said at least one inlet and forwardly of the rear of the trailer so as to provide general illumination of an area of and about the portable drive-over conveyor.

Another important independent optional feature is that the upper surface of the frame structure is formed by a plurality of plates spanning across the frame structure from a position at or adjacent one of the left and the right sides of the frame structure to a position at or adjacent the other one of the left and right sides. As such, the conveyor located beneath the upper surface of the frame structure is easily accessible for example for maintenance or repair purposes.

An axle rotatably supporting a pair of the plurality of wheels may be connected to the frame structure by an oversized gas bag arranged for raising and lowering the frame structure between a transport height and ground level.

Thus, generally speaking with reference to features mentioned earlier in this section:

In one arrangement the conveyor of at least one of the portable drive-over conveyor includes a first portion extending longitudinally of the trailer from the inlet to an intermediary location spaced rearwardly of the inlet and a second portion extending from the intermediary location to the discharge of the conveyor that is located beyond the trailer.

Another important independent optional feature is that the second portion is arranged for swiveling movement about an upstanding axis such that the discharge of the conveyor is positionable to either side of a central axis longitudinal of the trailer.

Another important independent optional feature is that the second portion is positionable from a working position locating the discharge of the conveyor beyond the trailer to a transport position where the second portion lies within a perimeter of the trailer.

According to an aspect of the invention there is provided a portable drive-over conveyor for unloading particulate material from trucks comprising:

a trailer having a frame structure with front and rear ends opposite one another on a trailer axis and first and second sides spanning between the forward and rear ends longitudinally of said trailer axis where the front end, rear end, left side, and right side collectively define a periphery of the frame;

the trailer including a hitch coupling supported at the front end of the frame structure for coupling to a towing vehicle;

the trailer including a plurality of wheels rotatably coupled at the rear end of the frame structure such that the trailer is towable across a support surface by the towing vehicle;

a conveyor carried by the frame structure and extending longitudinally of the trailer axis from one end to another end of the trailer;

the conveyor being arranged to transport particulate material to a discharge at one end of the trailer;

a first ramp assembly mounted on the first side for pivotal movement about an axis longitudinal of the first side such that the first ramp assembly is positionable in a manner extending outwardly from the first side to define a ramp allowing a truck wheel to move onto the frame structure from another surface;

a second ramp assembly mounted on the second side for pivotal movement about an axis longitudinal of the second side such that the second ramp assembly is positionable in a manner extending outwardly from the second side to define a ramp allowing a truck wheel to move onto the frame structure from another surface;

the ramp assemblies and the frame structure providing upper surfaces for supporting the truck as it passes from the first ramp assembly over the frame structure and onto the second ramp assembly;

the upper surface of the frame structure including a plurality of inlets at longitudinally spaced positions for passage of the particulate material discharged thereon through the upper surface to the conveyor.

BRIEF DESCRIPTION OF THE DRAWINGS

Arrangements of the invention will now be described in conjunction with the accompanying drawings in which:

FIG. 7 is transverse cross sectional view of the embodiment of FIG. 1.

FIG. 8 is part only of the cross sectional view of FIG. 5 on an enlarged scale showing the conveyor.

FIG. 12 is an isometric view of a pair of the portable drive-over conveyors according to the present invention that shows a cooperative operating position of the pair.

FIG. 16 is a top plan view of the pair of the portable drive-over conveyors of FIG. 12.

FIG. 17 is a cross-sectional view along line 17-17 in FIG. 16.

FIG. 26A is a cross-sectional view as if it were taken along line 26-26 in FIG. 22 showing a chute in a raised position and omitting other components for clarity of illustration.

FIG. 26B is a cross-sectional view as if it were taken along line 26-26 in FIG. 22.

In the drawings like characters of reference indicate corresponding parts in the different figures.

DETAILED DESCRIPTION

The figures show a novel portable drive-over conveyor 1 which is suited for transferring particulate material, such as aggregate, salt, grain, and fertilizer, that is unloaded from a dump truck (not shown) and moved from the truck to another location in proximity to the portable drive-over conveyor. For example, this other location may comprise an open area adjacent the portable drive-over conveyor such that the particulate material is simply unloaded into an uncontained stockpile, or this other location may comprise for example a hopper H of another conveyor further transferring the particulate material to a barge, ship, rail car, another trailer, bin, silo, or indoor bulk storage facility. As will be better appreciated shortly hereinafter, the portable-drive over conveyor 1 is designed particularly for simultaneously unloading a plurality of trucks side by side.

The portable drive-over conveyor 1 may be operated in a system S (see for example FIG. 12) formed by a plurality of such drive-over conveyors, where a pair of the drive-over conveyors is shown in the illustrated arrangement. This system is operable to perform unloading of one or more trucks each with multiple discharges. Specifically, in the illustrated arrangement a truck having two discharges may be unloaded at each one of its multiple discharges, that is unload points of the truck.

Turning now to the constituent drive-over conveyors of the system S, the portable drive-over conveyor 1 comprises a trailer 4 forming a base of the portable drive-over conveyor. The trailer has an overall frame structure 6 with a front end 8A, rear end 8B, and left and right sides 8C and 8D spanning between the front and rear ends. The trailer thus comprises a trailer axis T with the front and rear ends 8A, 8B being longitudinally spaced apart along the trailer axis T and the left and right sides 8C, 8D of the trailer extending longitudinally of the trailer axis T.

Figure 1:
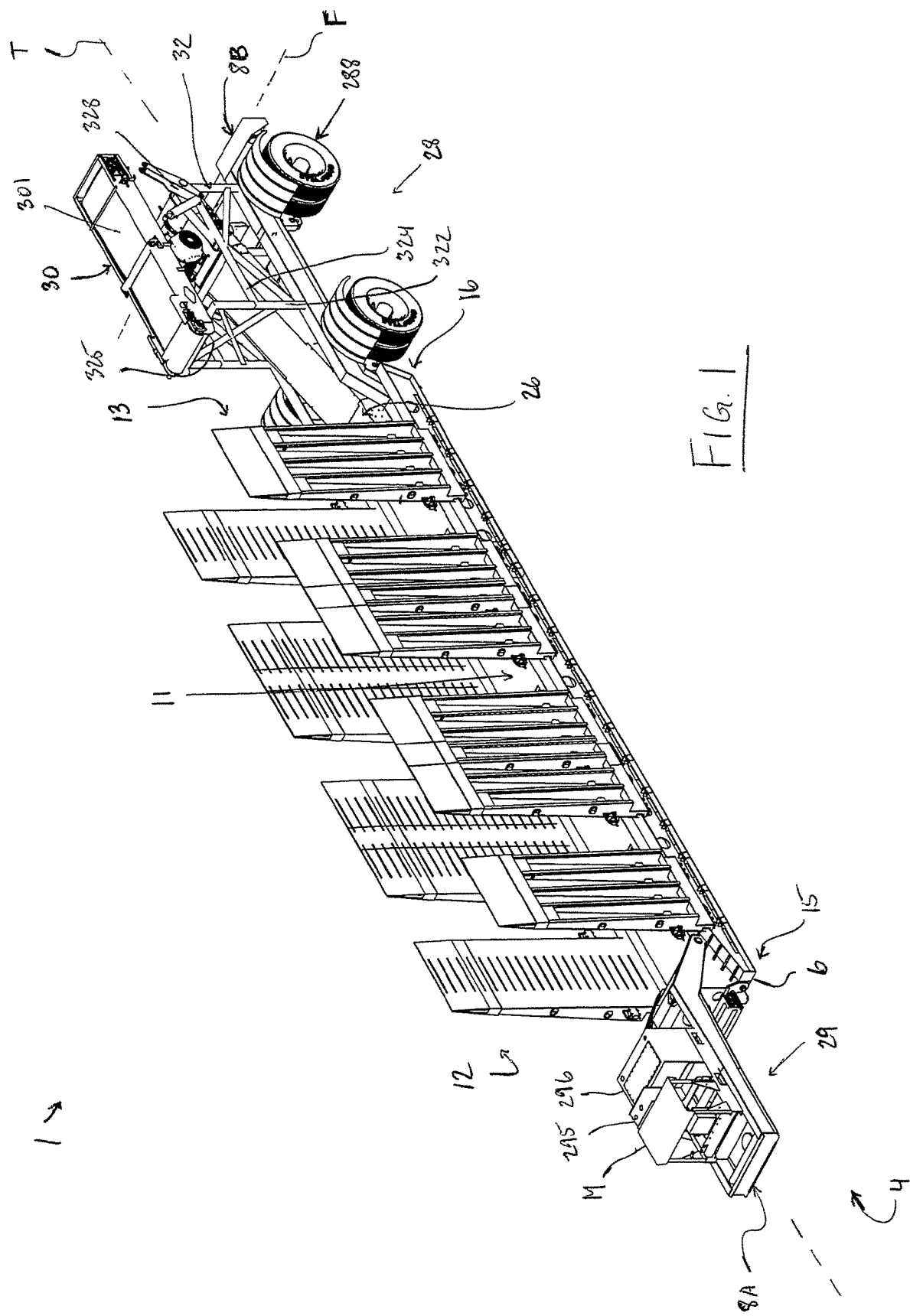
FIG. 1 is an isometric view of a portable drive-over conveyor according to the present invention that shows the portable drive-over conveyor in a transport position with some components omitted for clarity of illustration.
Figure 2:
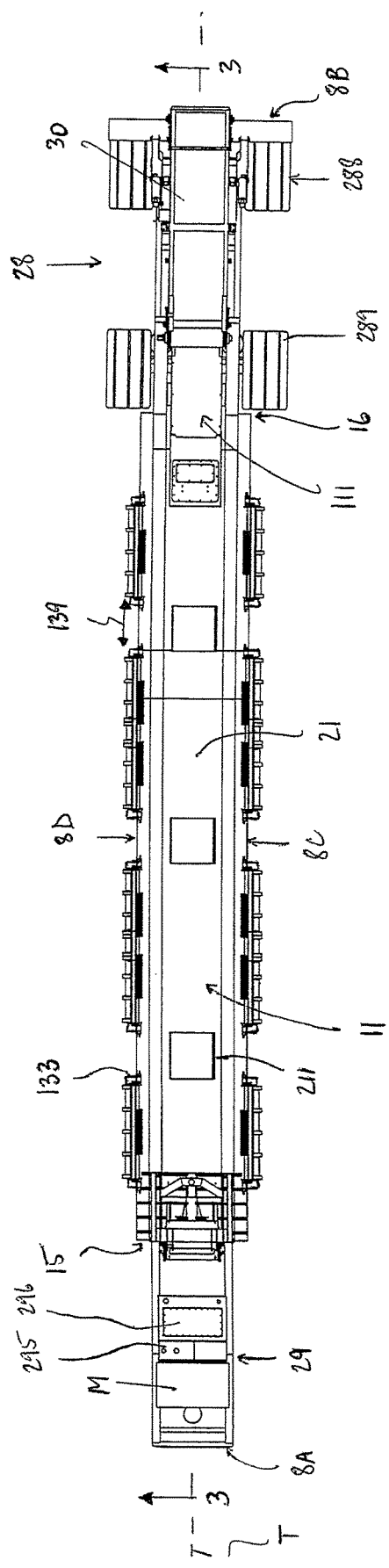
FIG. 2 is a top plan view of the portable drive-over conveyor of FIG. 1.
Figure 3:
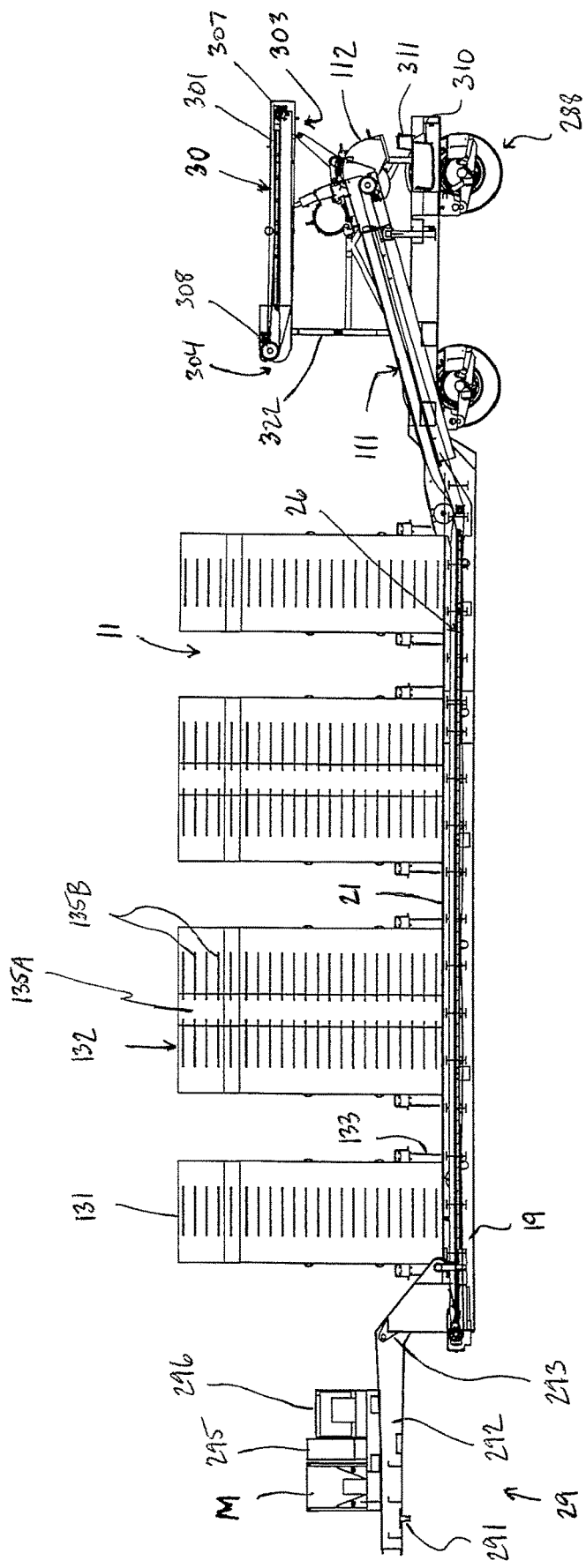
FIG. 3 is a cross-sectional view along line 3-3 in FIG. 2.
Figure 4:
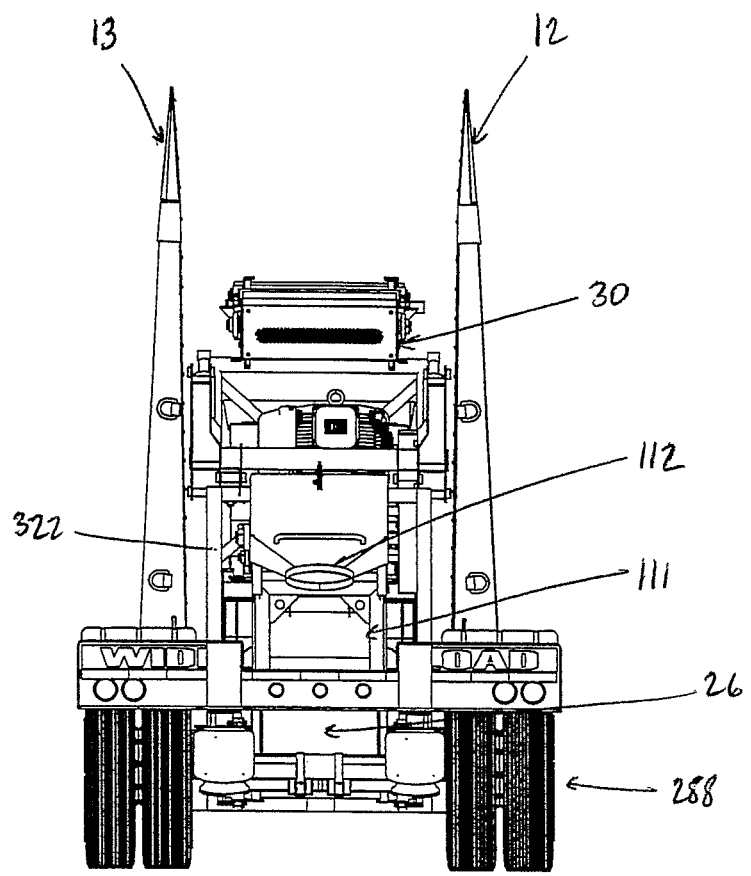
FIG. 4 is a rear elevational view of the portable drive-over conveyor of FIG. 1.
Figure 6:
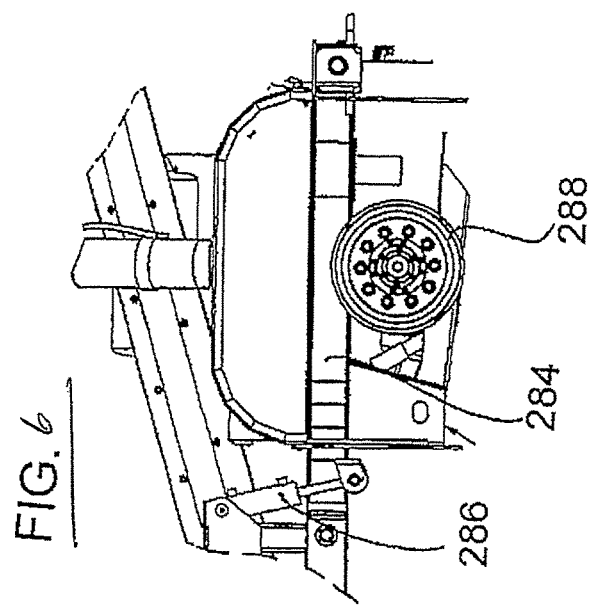
FIG. 6 is part only of the vertical central cross sectional view of FIG. 4 on an enlarged scale showing rear frame and ground wheels.

The front end, rear end, and left and right sides 8A-8D collectively define a periphery of a frame of the trailer which is more clearly shown in top plan view in FIG. 2. It will be appreciated that an overall width of the trailer 4 is non-uniform along its length from front 8A to rear 8B, such that the periphery may not be a regularly shaped polygon, as for example a rectangle, but instead may be irregularly shaped so as register with those features of the portable drive-over conveyor which extend transversely from the central trailer axis T at different distances therefrom. Furthermore, the periphery of the trailer may be considered to vary in shape from one position of ramp assemblies 12, 13 to the next as will become apparent shortly.

The arrangement shown herein includes a center frame structure 11, a first ramp assembly 12 on one side, and a second ramp assembly 13 on the second side so that the truck to be unloaded can drive over the portable drive-over conveyor entering from one ramp, halting with a discharge of the truck at the center section and then departing over the second ramp.

The center frame structure 11 has a forward end 15, a rearward end 16 and first and second sides 17, 18. The center frame structure includes a pair of longitudinal beams 19, 20 forming the main structural components, an upper support surface 21 and a bottom cover panel 22. The panel 22 sits on the ground during operation and the beams support the top surface 21 on a transverse wall 23 and upstanding walls 24, 25 (FIG. 8). The top support surface 21 extends along the full length of the center section.

The first and second ramp assemblies 12, 13 are symmetrically mounted on the respective side 18 for pivotal movement about an axis 181 longitudinal of the first side 18 (or second side 17) from a raised positon standing vertically upwardly above the first side 18 for transport of the portable drive-over conveyor from place to place. When delivered to a required location, the ramp assemblies are lowered to an operating position extending outwardly from the respective side as shown in the figures to define a ramp allowing a truck wheel to move from the ground onto the center frame structure for the delivery process.

Each ramp assembly comprises a plurality of side by side parallel ramp members 131 and 132 which can be raised and lowered by cylinders 133 (shown schematically) at sides of the ramps.

Each ramp includes an inclined upper surface 135 attached at its edges to two triangular sides 137 which attach also to a bottom wall 136 which sits on the ground and transfers loads from the vehicle to the ground from the upper surface 135. The upper surface and the bottom surface converge to an edge 138 at the outer end of the ramp which is sufficiently sharp to allow the vehicle wheel to enter onto the ramp without the necessity for an earthen ramp beyond the edge 138. The ramps and the center frame structure thus provide upper surfaces for supporting the truck as it passes from the first ramp over the center frame structure and onto the second ramp. The ramps 131, 132 are spaced along the side edges of the center section by a space 139 so that any material from the vehicle which does not enter onto the center section for conveying falls to the ground rather than is collected on the ramps.

A first conveyor 26 is arranged to extend along the center frame structure 11 and arranged to transport the particulate material longitudinally along the center frame structure 11 up an inclined section 111 of the first conveyor to a discharge chute 112 at one end of the center frame structure which is at a rear frame 28 at the rear end 16. The center frame structure 11 and rear frame 28 collectively define part of the overall frame structure 6 of the trailer.

The upper surface 21 of the center frame structure 11 has a plurality of central rectangular openings 211 defining inlets of the first conveyor for passage of the particulate material discharged over the respective inlet opening through the upper surface to the conveyor 26. Each inlet is spaced from the side edges of the upper surface and from the ramps and forms a relatively localized area within the upper surface. Thus, each of the first conveyor's inlets is located between the left and right sides 8C, 8D of the overall frame structure.

Each inlet opening is substantially equal in width to the space 139 between the pair of the ramp members arranged to straddle that inlet opening in front thereof and to the rear thereof so that lifting of the ramps to the raised position does not cause any material to fall from the ramps into the inlet opening.

In the illustrated arrangement the ramp members which are immediately adjacent to one another but belonging to different pairs are formed into a unitary ramp. That is, the adjacent ramp members of different pairs are arranged to share a common edge portion 135A to one side of traction protrusions 135B which provide grip to truck wheels traversing the ramp. Thus, these adjacent ramp members move together from the raised position to the operating position thereby reducing the number of drive members for example cylinders 133 that are required to actuate this movement of the ramp assemblies.

Furthermore, each inlet 211 of the first conveyor comprises a funnel structure 2111 which is independent of the upper surface 21 such that the funnel structure is movable relative thereto. That is, with an open top of the funnel structure 2111 defining the inlet opening 211 and a neck 2113 extending downwardly from a bottom opening of the funnel structure so as to guide the particulate material discharged from the trucks onto the first conveyor 26, the funnel structure is arranged for raising above the upper surface of the center frame structure using a hydraulic actuating arrangement, for example hydraulic cylinders. As such, the funnel structure may be raised upwardly towards the respective discharge of the truck so as to the position the inlet 211 closer to the truck discharge for capturing as close to all of the particulate material discharged therefrom.

The center structure 11 has at the front edge 15 a frame component 29 attached to the center frame structure at the forward end so as to extend forwardly therefrom and includes a planar platform 292 generally parallel to the center frame structure at a height raised from the center frame structure. The platform 292 is attached to the center structure by a frame connection which is designed to transfer loads during transport from the center section to the platform so that the platform is cantilevered forwardly from the center frame structure 11. The free end of the platform, opposite to that end which is attached to the center frame structure, thus defines the front end 8A of the trailer's overall frame structure. Furthermore, the platform carries drive components including a motor arrangement M together with hydraulic drive systems and control units 295, 296 for conveyors of the portable drive-over conveyor 1.

Underneath the platform is provided a king pin 291 depending from an underside of the frame for engaging a towing platform of a highway tractor (not shown). As such, the king pin together with the platform define a hitch coupling of the trailer 4.

Figure 5:
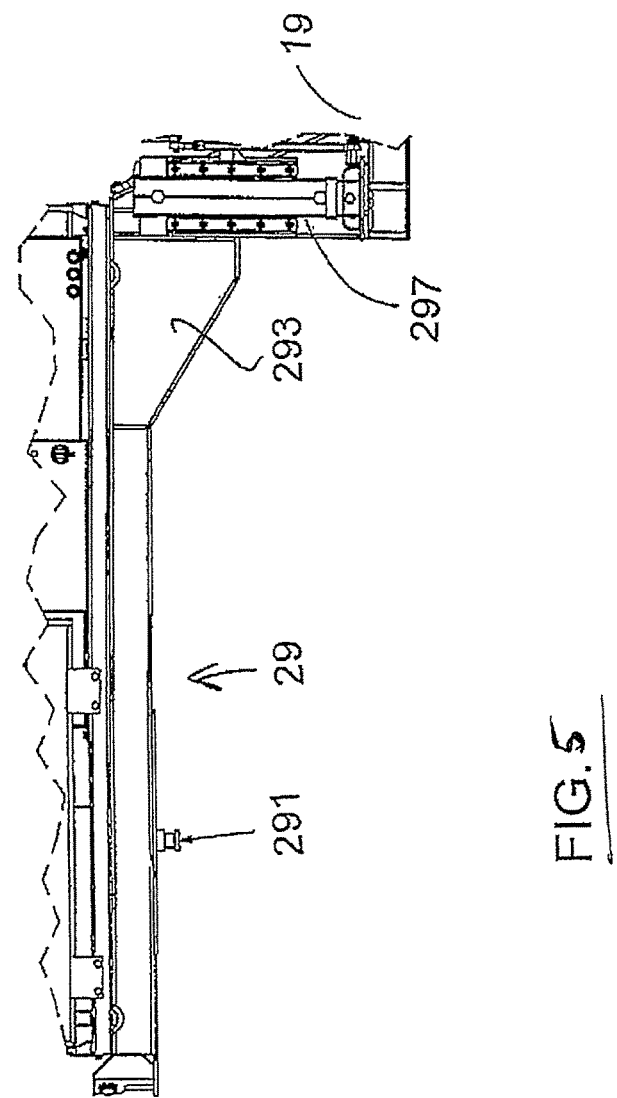
FIG. 5 is a part only of the vertical central cross sectional view of FIG. 4 on an enlarged scale showing the front platform.
Figure 9:
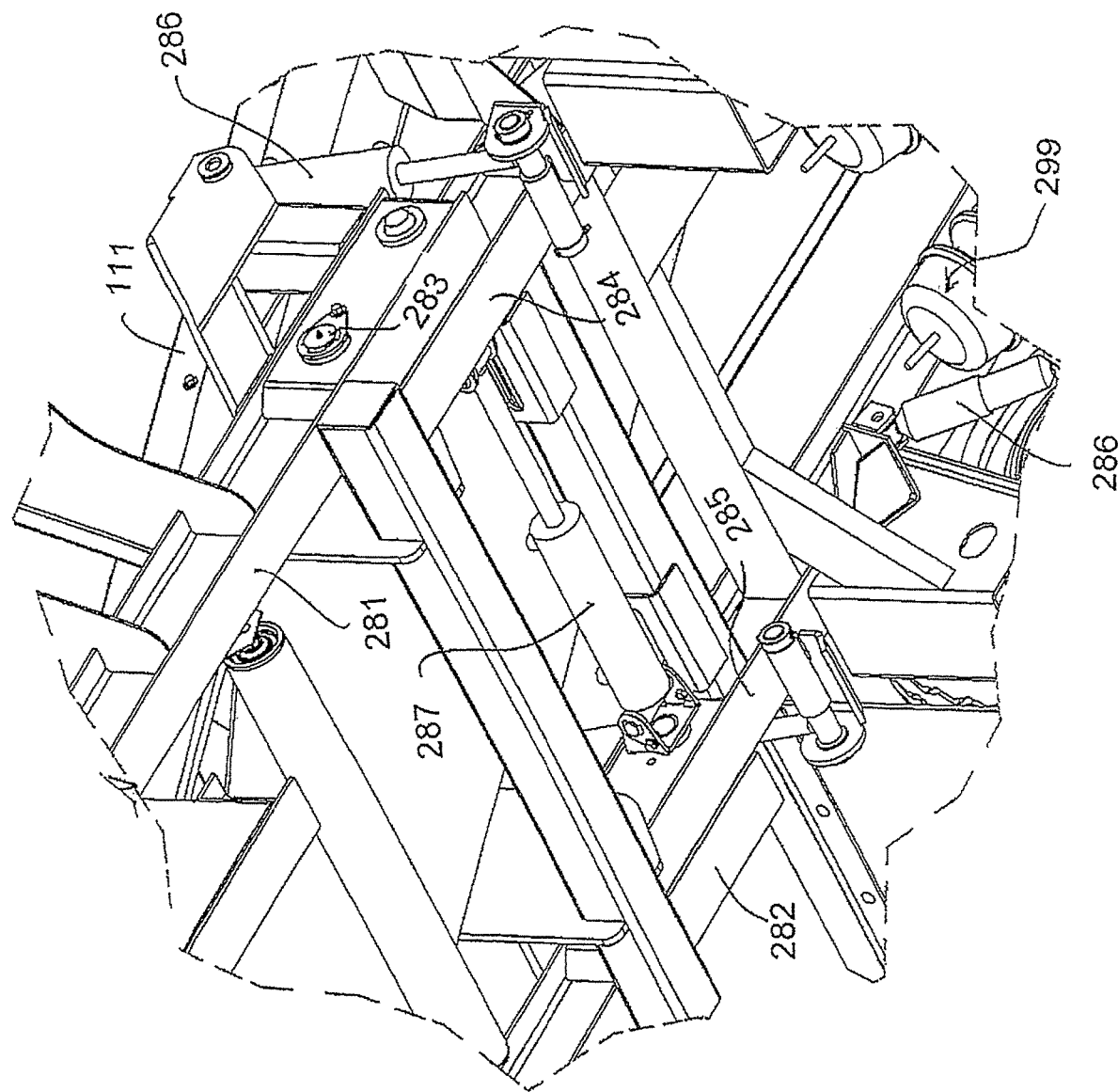
FIG. 9 is an isometric view from underneath of the rear section only of the portion of FIG. 3.
Figure 11:
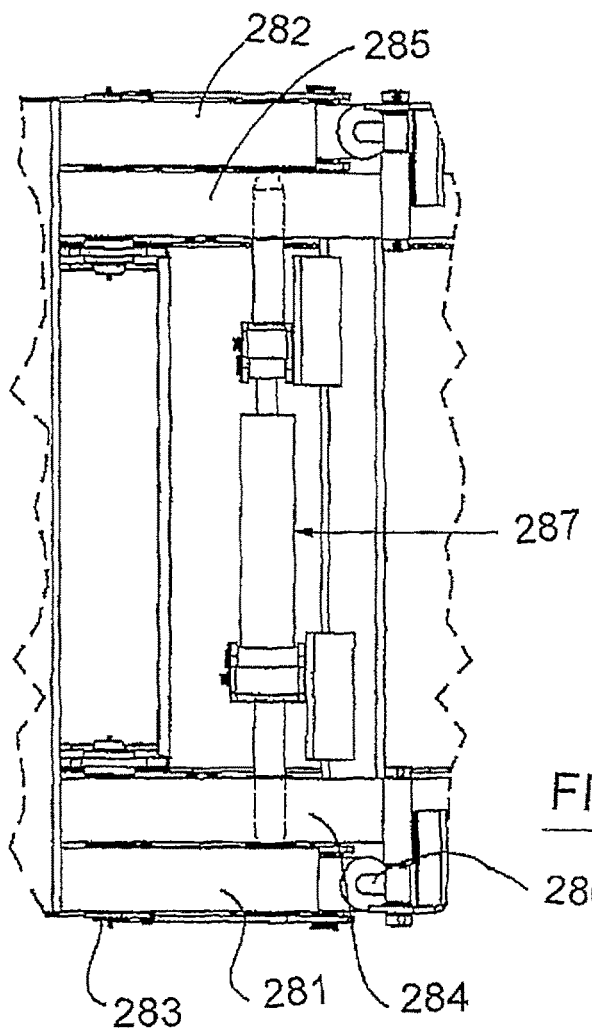
FIG. 11 is a side view of a part only of the rear section of FIG. 9.
Figure 10:
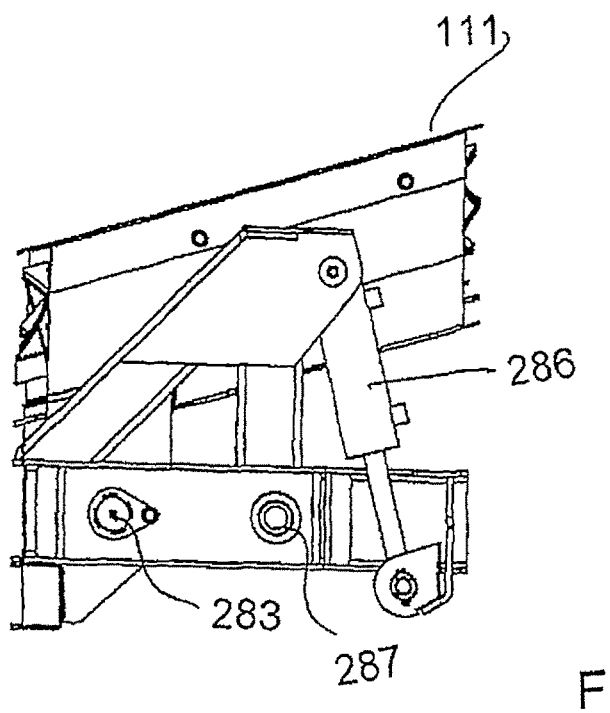
FIG. 10 is a plan view of a part only of the rear section of FIG. 9.
Figure 13:
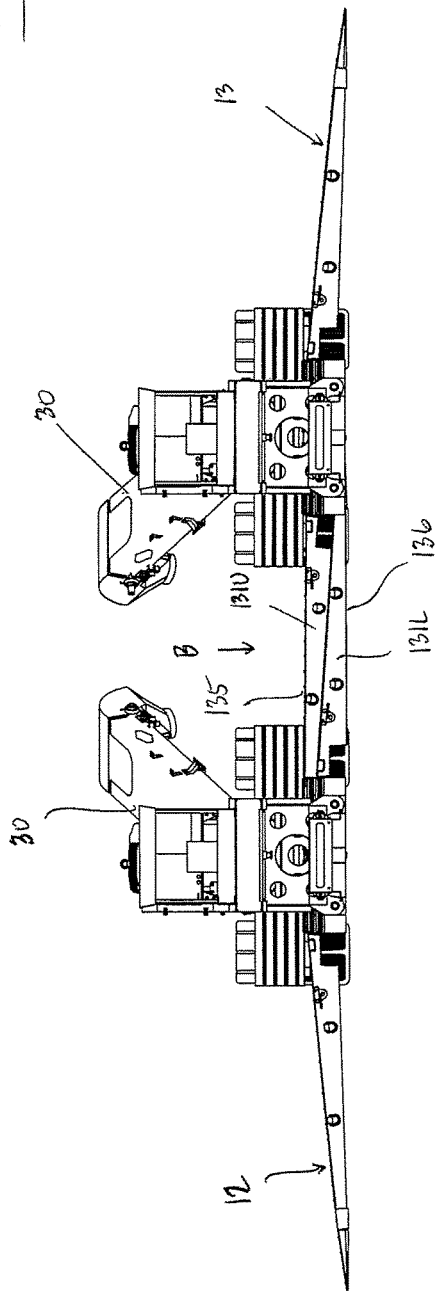
FIG. 13 is a front elevational view of the pair of the portable drive-over conveyors of FIG. 12.
Figure 14:
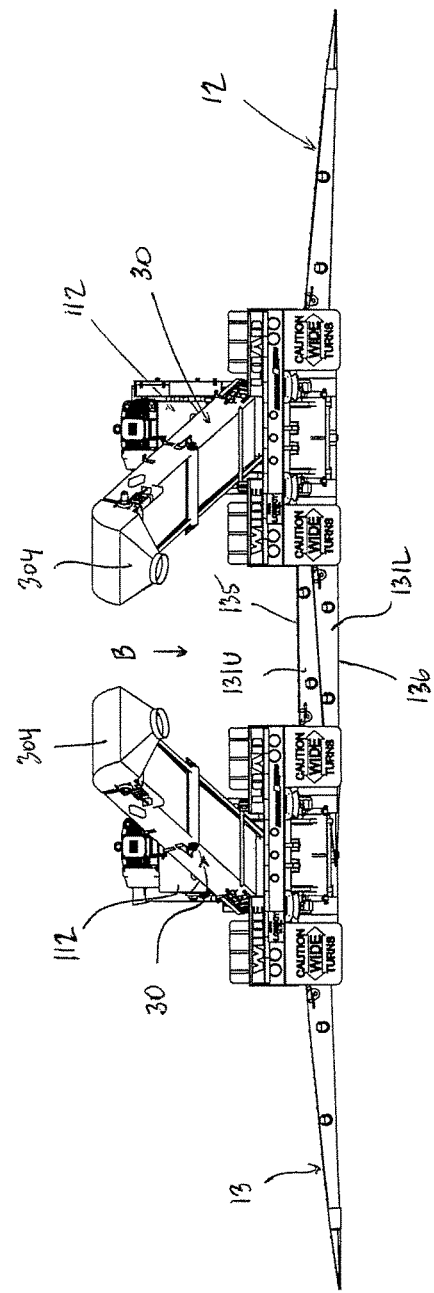
FIG. 14 is a rear elevational view of the pair of the portable drive-over conveyors of FIG. 12.
Figure 15:
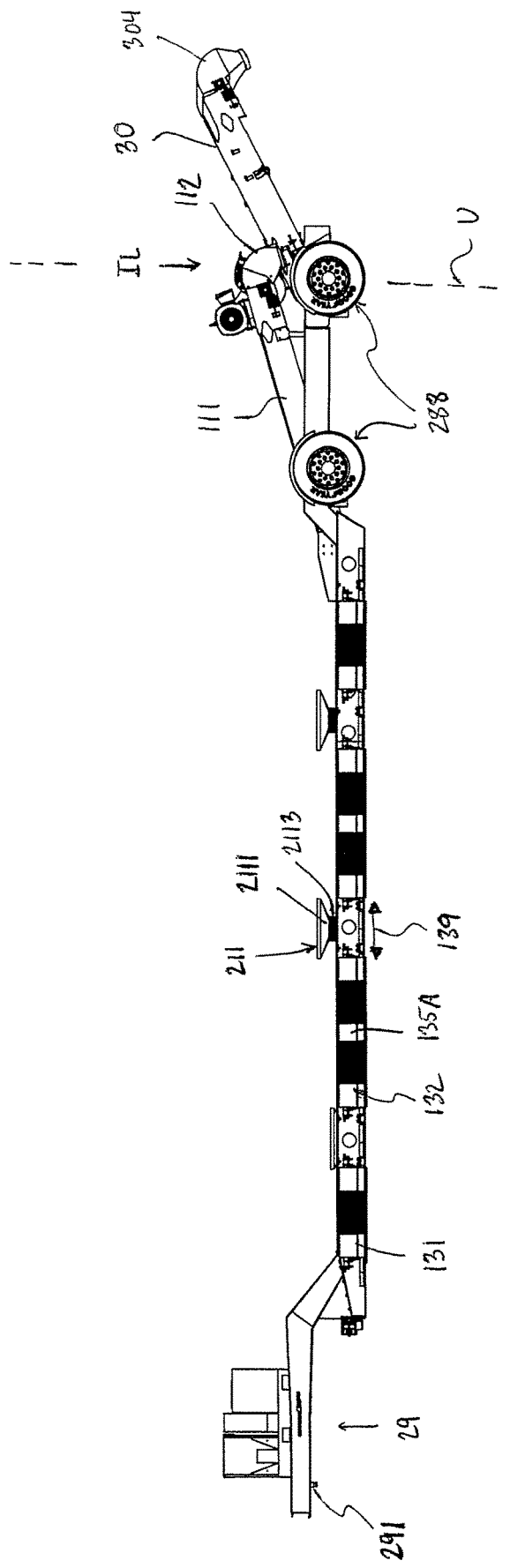
FIG. 15 is a side elevational view from one side of the pair of the portable drive-over conveyors of FIG. 12.
Figure 18:
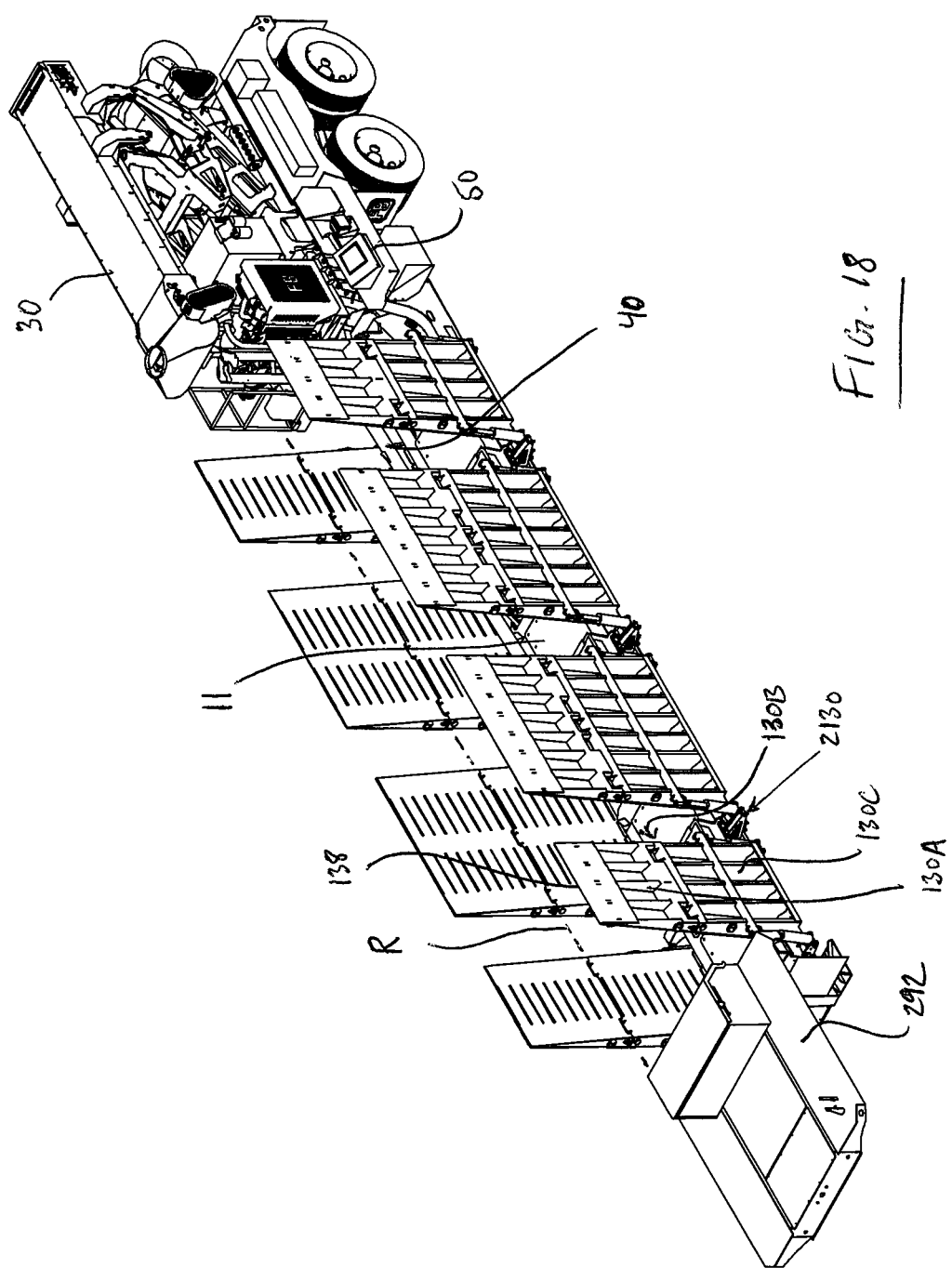
FIG. 18 shows another arrangement of portable drive-over conveyor according to the present invention where the portable drive-over conveyor is shown in a transport position and some components are omitted for clarity of illustration.
Figure 19:
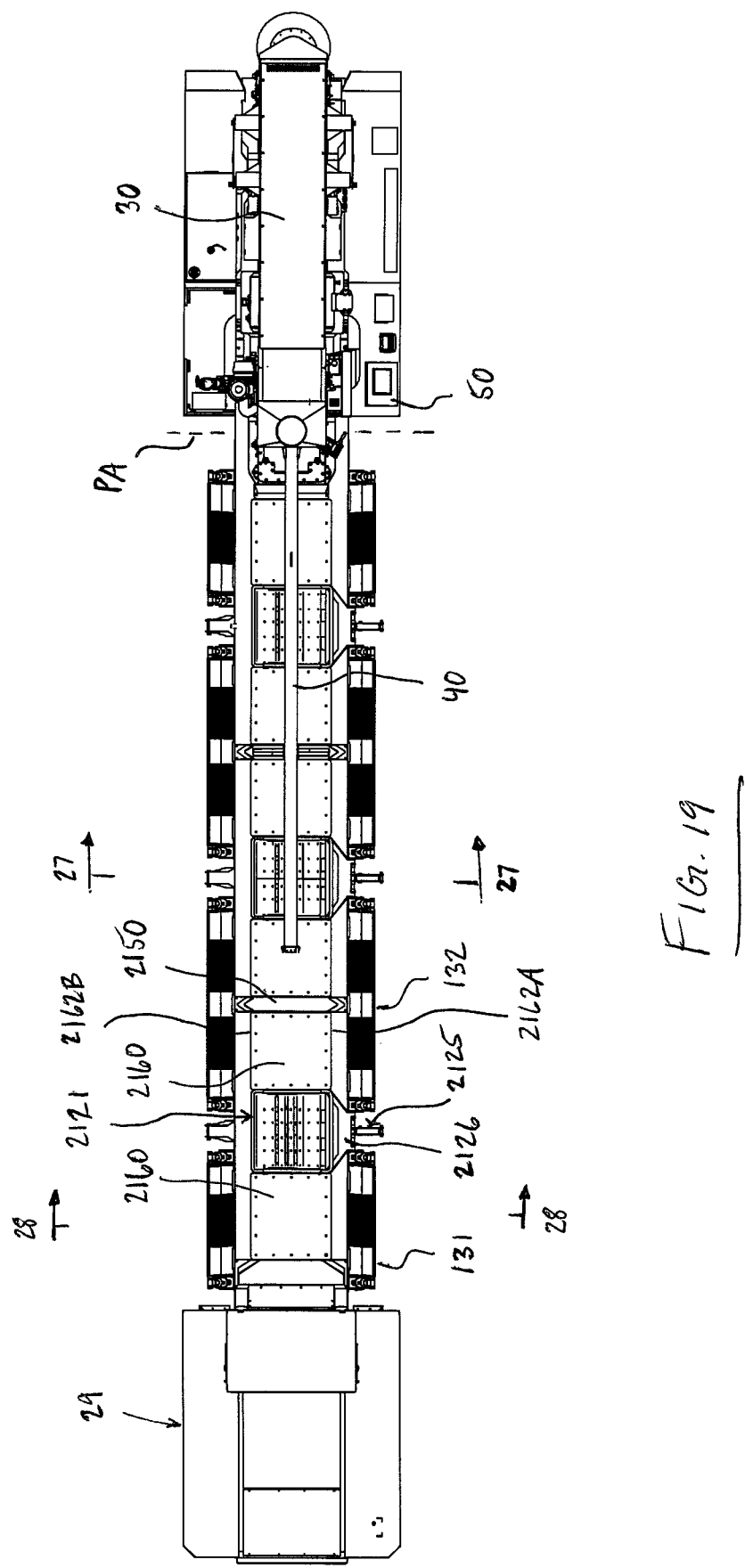
FIG. 19 is a top plan view of the portable drive-over conveyor of FIG. 18.
Figure 20:
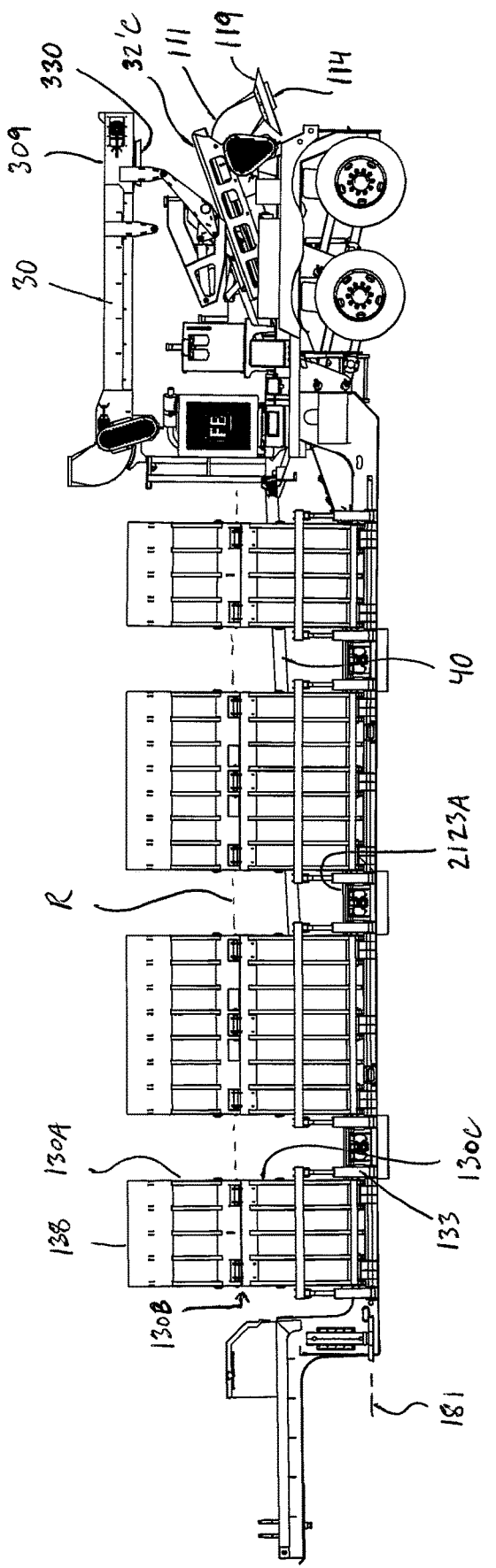
FIG. 20 is a side elevational view of the portable drive-over conveyor of FIG. 18.
Figure 21:
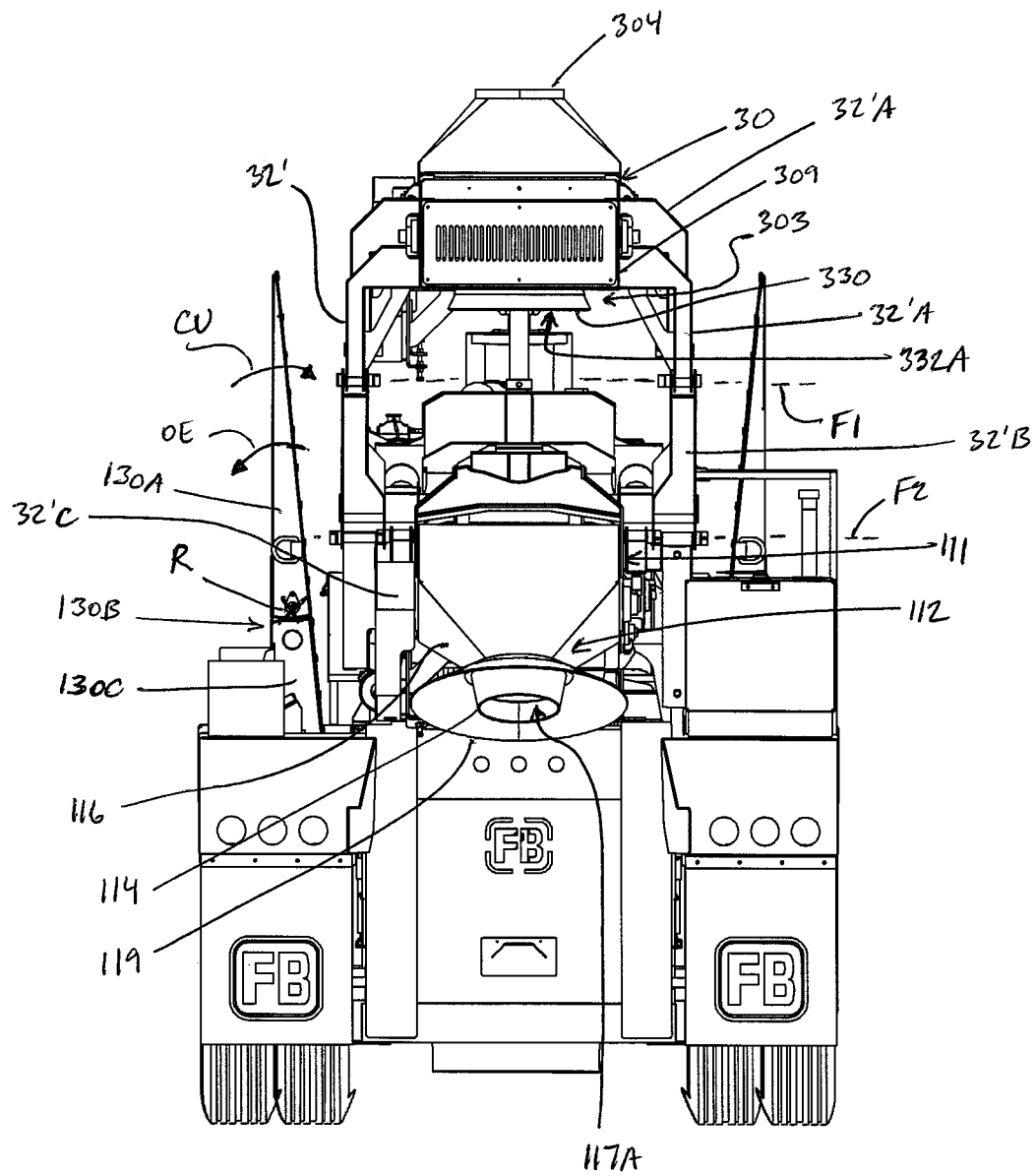
FIG. 21 is a rear elevational view of the portable drive-over conveyor of FIG. 18.
Figure 22:
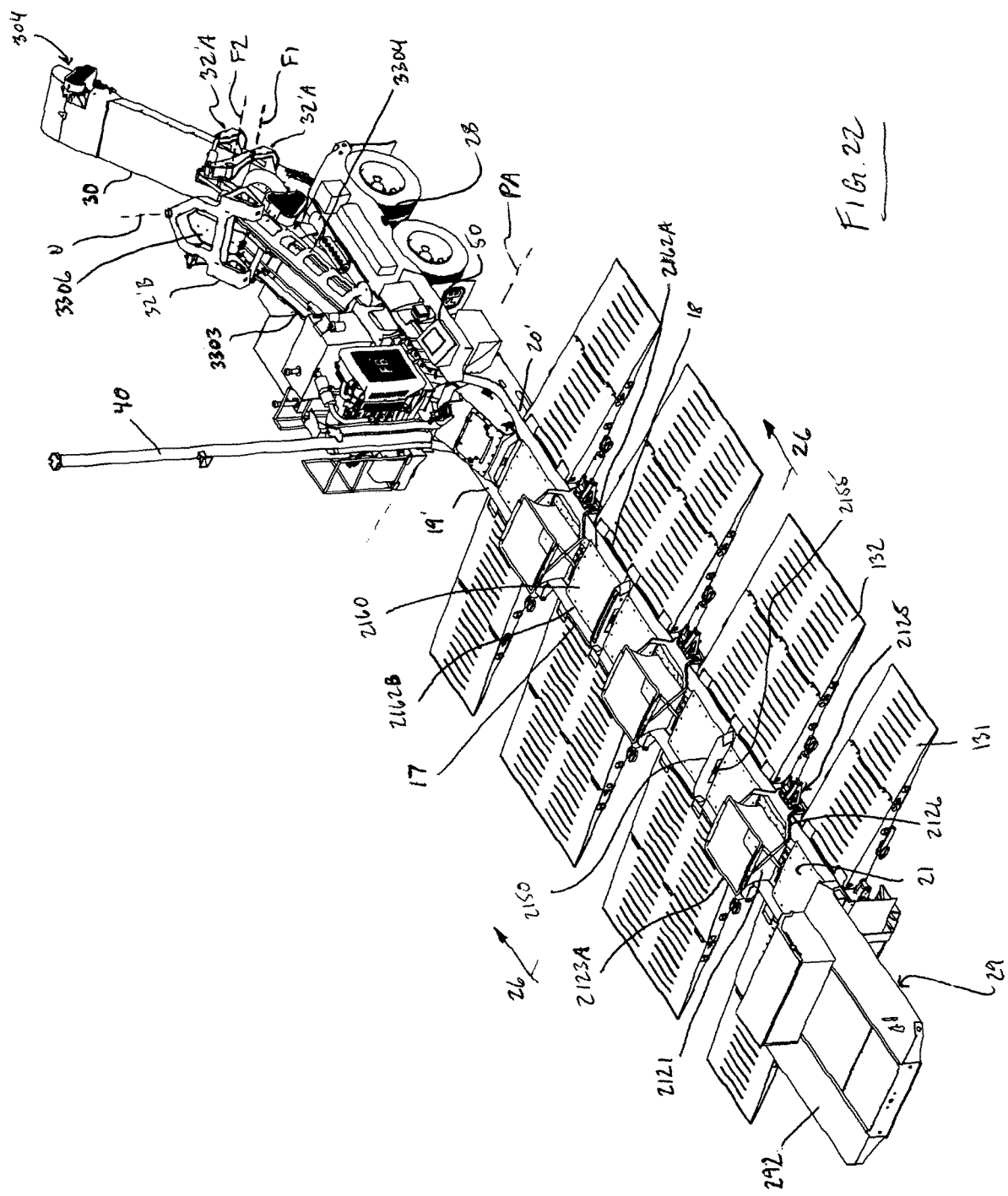
FIG. 22 illustrates in perspective view the portable drive-over conveyor of FIG. 18 in an operating position.
Figure 23:
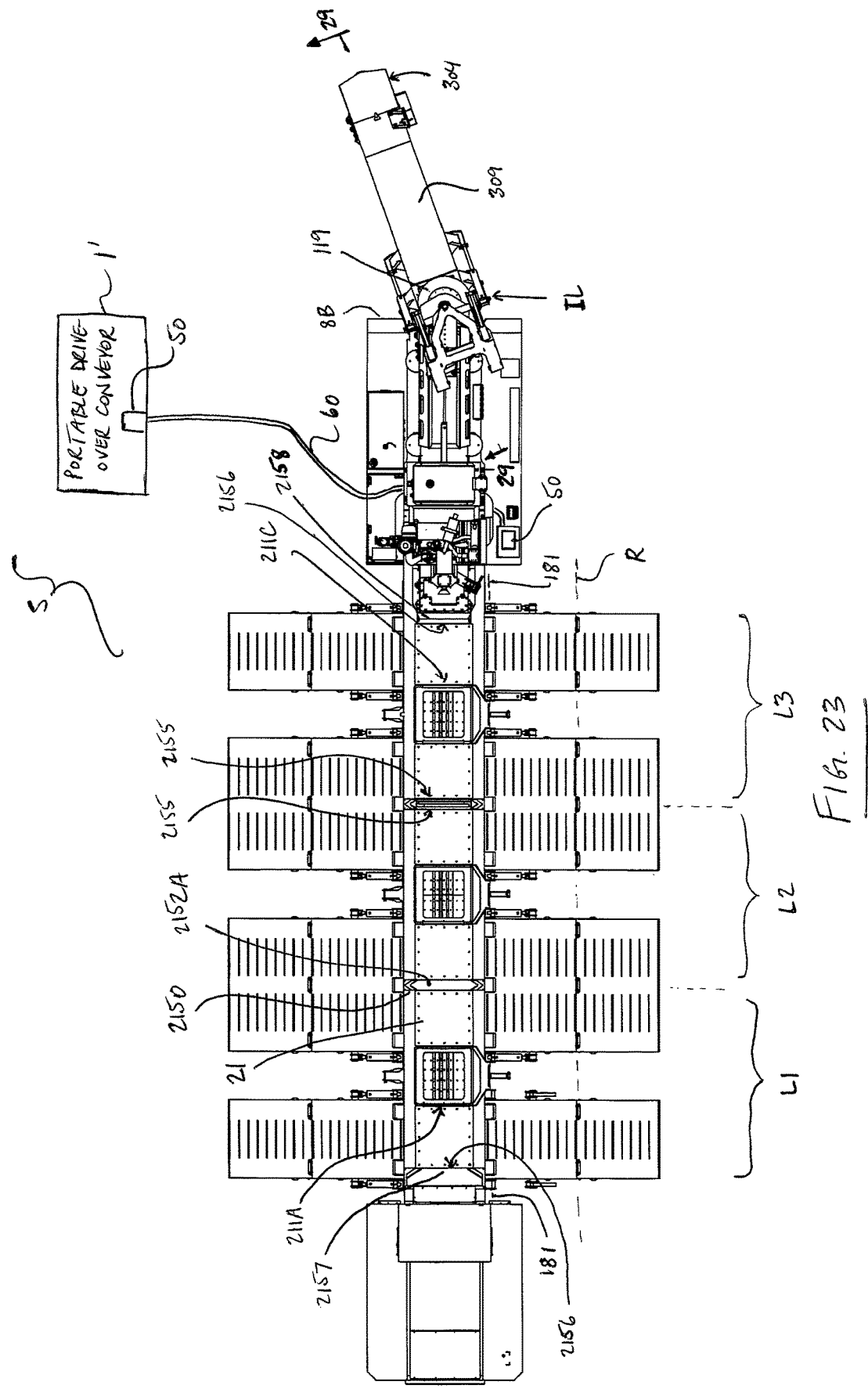
FIG. 23 is a top plan view of the portable drive-over conveyor as shown in FIG. 22 with a second portable drive-over conveyor illustrated schematically.
Figure 24:
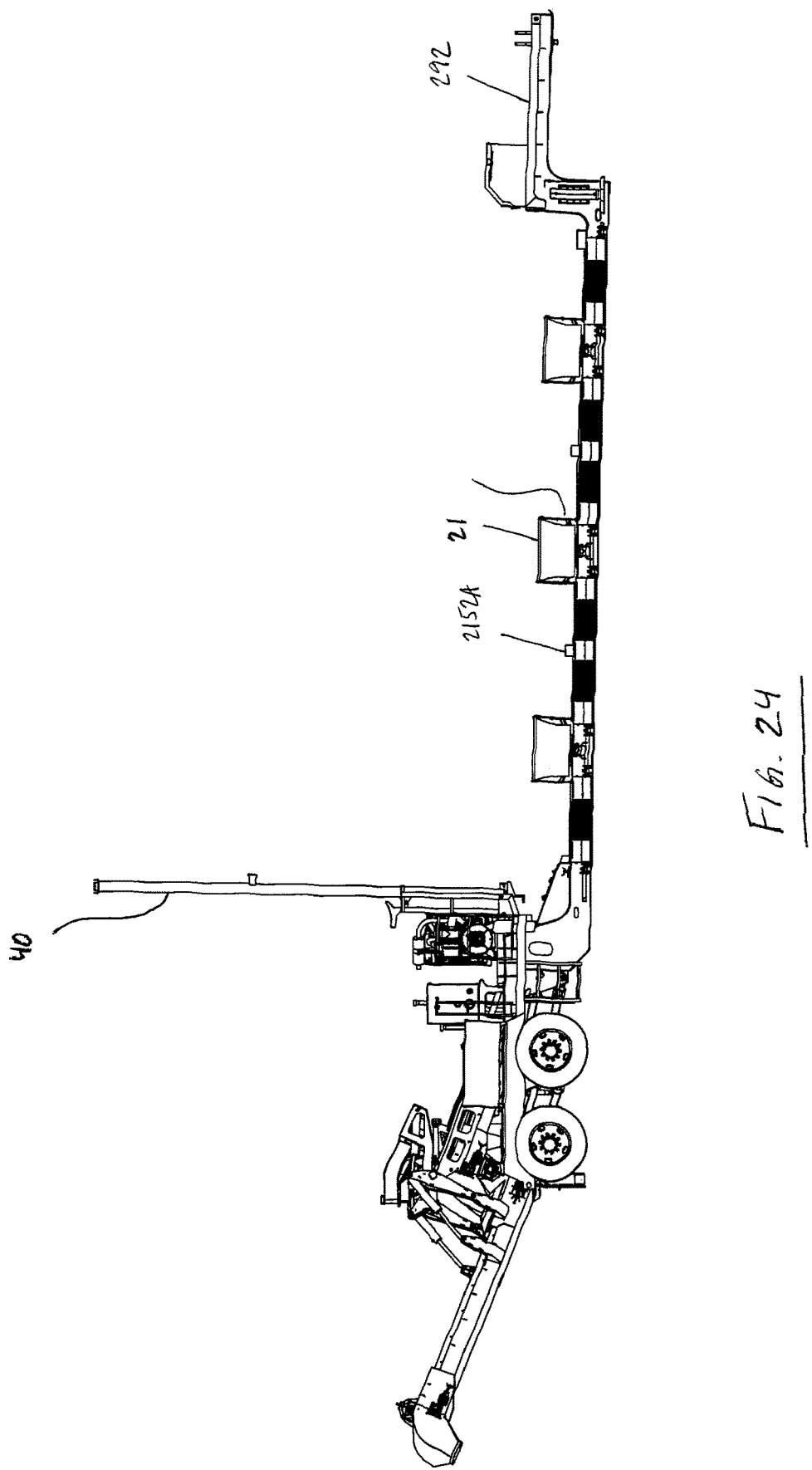
FIG. 24 is a side elevational view of the portable drive-over conveyor as shown in FIG. 22.
Figure 25:
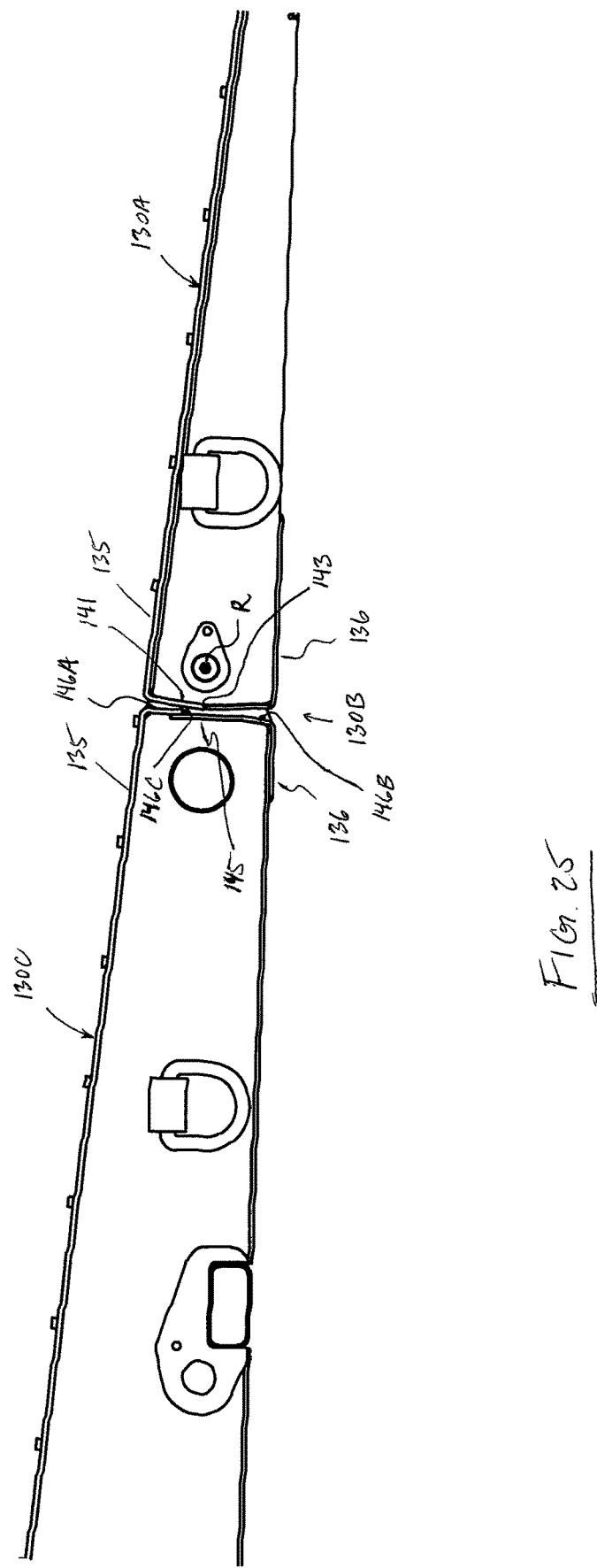
FIG. 25 is an elevational view of one ramp member of the portable drive-over conveyor of FIG. 18 showing a joint of the ramp member.
Figure 26C:
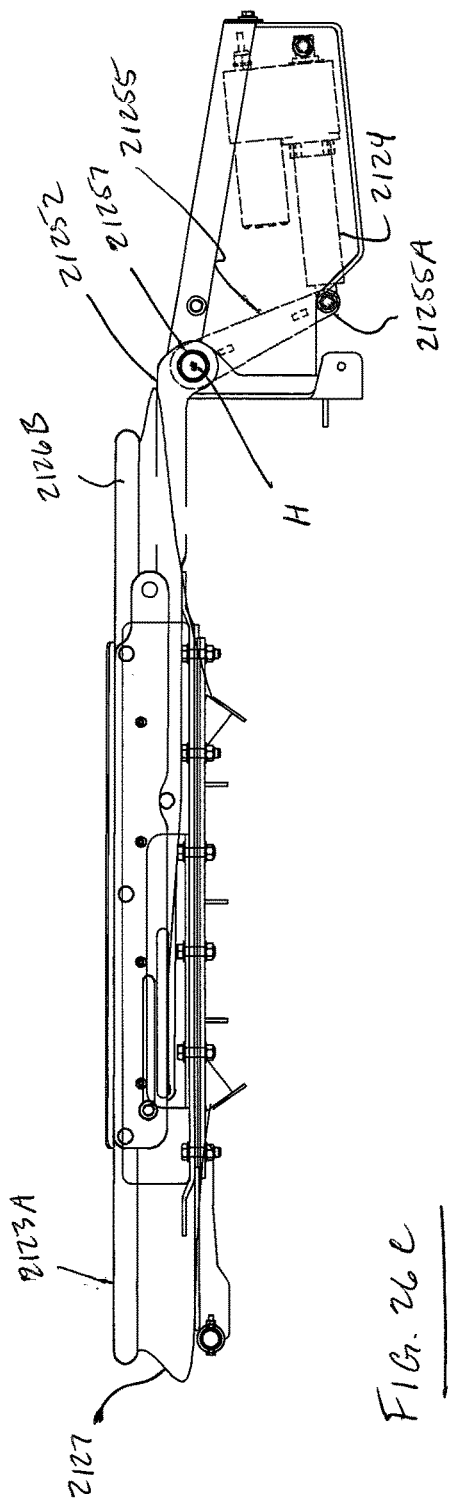
FIG. 26C is a cross-sectional view like that in FIG. 26A but now showing the chute in a lowered position.
Figure 26D:
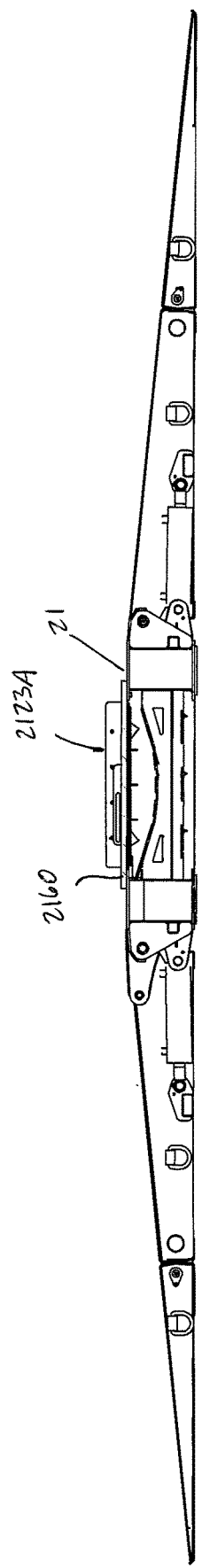
FIG. 26D is a cross-sectional view like that in FIG. 26B with the chute in the lowered position of FIG. 26C.
Figure 27:
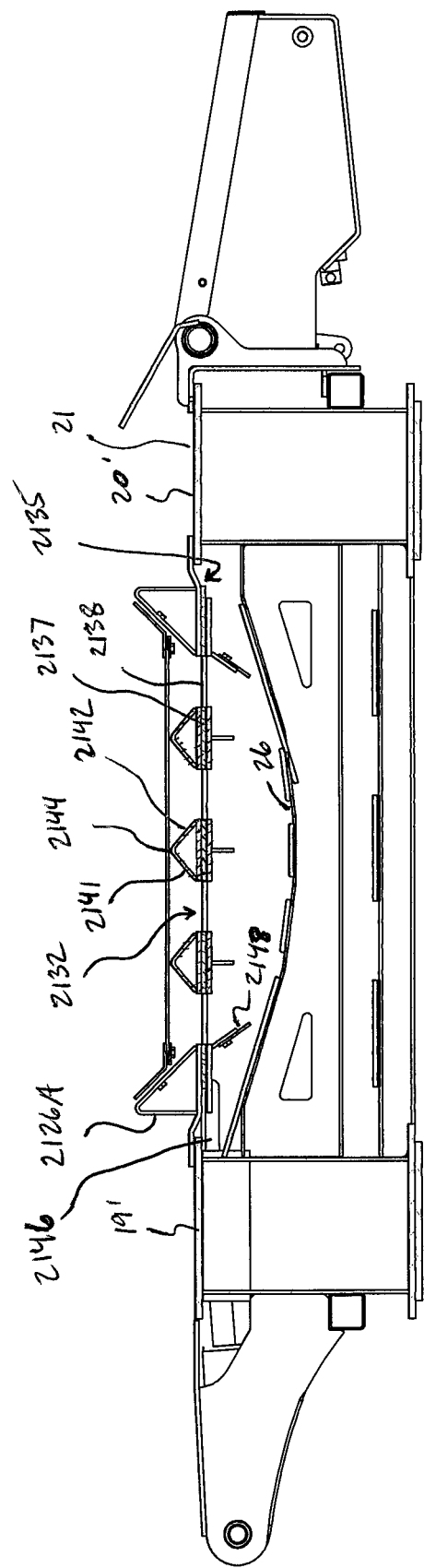
FIG. 27 is a cross-sectional view as if it were taken along line 27-27 in FIG. 19.
Figure 28:
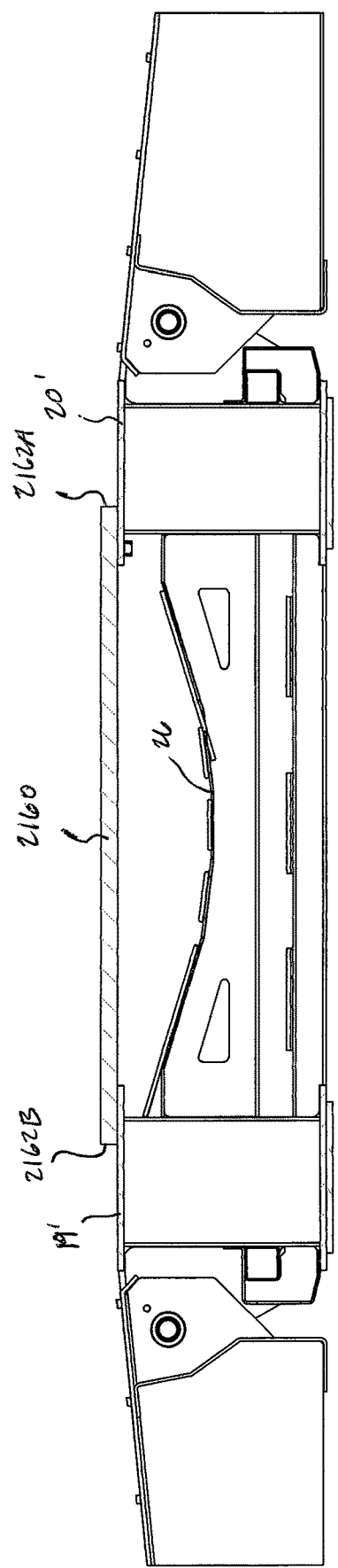
FIG. 28 is a cross-sectional view as if it were taken along line 28-28 in FIG. 19, with some components removed for clarity of illustration.

As more clearly shown in FIG. 5, the frame platform at the frame 293 connecting to the center section carries conventional jacking legs used on semi-trailers to jack to the ground. The legs which can be moved from a raised position in which the center frame structure rests on the ground to a lowered position in which feet of the legs sit on the ground and lift the center frame structure to be raised from the ground and the towing platform of a highway tractor, defining a towing vehicle, can move underneath the king pin.

The rear frame structure 28 extends rearwardly from the center frame structure at a position thereon raised from a bottom of the center frame structure and carries the upwardly and rearwardly extending portion 111 of the conveyor 11. The rear frame includes a pair of parallel beams 281, 282 connected at a forward end to a frame coupling to the center section to transfer loads therebetween. An inner frame defined by parallel beams 284, 285 located inside the beams 281, 282 is pivotal relative to the outer frame on a transverse pivot pin. The inner frame is pivotal by a drive cylinder 286 and can be locked in a lowered positon for transport by a locking pin 297 which drives a pin across aligned holes of the beams. The inner frame carries a plurality of wheel and axle assemblies 288 for movement relative to the center frame structure and the outer rear frame from a lowered road position to a raised position allowing the center frame structure 11 to rest on the ground. The wheel and axle assembly includes highway tires and a gas bag suspension of the relative to the inner frame which is arranged for highway travel. As such, wheels 289 are rotatably coupled to the overall frame structure 6 such that the trailer is towable across a support surface or roadway by the towing vehicle, such as the highway tractor.

Each of the ramp assemblies tapers to the outer ramp edge 138 and a length between the outer ramp edge 138 of the first pair of ramps and the other ramps is at least 25 feet and preferably of the order of 28 feet which combined with a height of the center structure from the ground to the upper surface which is of the order of or less than 12 inches allows conventional belly discharge highway semi-trailers to pass over without grounding out and without requirement for any earthen ramp beyond the edges 138.

As shown in FIG. 7, the center frame structure 11 includes for each ramp assembly 12, 13 an outwardly extending shoulder 182 on which the inner edge 183 of the respective ramp assembly sits. This acts to transfer loads form the ramp as the truck passes over from the ramp to the center structure and to reduce loading on the pivot at the axis 181.

As shown in FIG. 8, the conveyor 26 includes a belt 261 which has an upper run underneath the respective inlet opening 211 which sits on a downwardly concave support surface 263 carried by the center frame structure at the transverse sheet 23 of the beams 19, 20. The support surface 263 carries a plurality of stationary strips 264 of a plastics bearing material on which the upper run of the belt slides. This allows the belt to slide effectively and avoids the increase in height that would in incurred if rollers were used. The concave shape of the belt and support provides space for the sand to enter and be carried on the belt while again avoiding an increase in height of the center section. The return run 262 of the belt slides on a bottom support surface defined by the sheet 23 on which is provided a plurality of stationary strips 265 of the plastics bearing material. The support sheet 263 is carried on upstanding side sheets 266, 267 carried on the sheet 23.

Thus, in summary of a first portion of the portable drive-over conveyor 1, the portable drive-over conveyor includes the trailer 4 to be towed as a highway semi-trailer. The portable drive-over conveyor 1 includes the center frame structure 11 containing a conveyor belt, defined by the first conveyor 26, with two pivotal ramps on each side to be moved to a raised positon standing upwardly and a lowered position extending outwardly. The ramps have sufficient length and the center structure has a low height to allow a highway semi-trailer to pass over a respective inlet opening in the center structure. A platform is attached at the forward end with a king pin on the underside for engaging a towing platform of a highway tractor. Wheel and axle assemblies including suspension of the axles for highway travel is mounted on a sub-frame pivotal relative to main rear frame for movement relative to the center frame structure from a lowered road position to a raised position allowing the center frame structure to rest on the ground.

There is provided a second conveyor 30 additionally to the first conveyor 26 that is swivably attachable to the frame 6 of the trailer 4 so as to be swivably movable about an upstanding axis U at the rear 8B of the trailer for discharging the particulate material from the portable drive-over conveyor to a preselected location beyond the conveyor 1 on either side of the trailer axis T.

The second conveyor thus comprises a separate length of conveyor belt 301 and its own inlet 303 and discharge 304 that are separate of the first conveyor. However, the first and second conveyors are cooperated such that the first conveyor 26 transfers particulate material from the plurality of inlets 211 to its discharge 112 located at an intermediary location IL spaced rearwardly of a rearmost one of the inlets, where an inlet 303 of the second conveyor is positionable beneath the first conveyor discharge 112 and the second conveyor may be fed so as to transfer the particulate material to its discharge 304 positionable beyond the periphery of the trailer.

It will thus be appreciated that the first conveyor 26 and the second conveyor 30 may be regarded as collectively defining a single conveyor having a first conveyor portion defined by the first conveyor and a second conveyor portion defined by the second conveyor. The first conveyor portion extends beyond a rearmost one of the inlets at the rearward end 16 of the center frame structure to the intermediary location with respect to the collective single conveyor, and the second conveyor portion thus extends from the intermediary location IL which is forward of the rear end 8B of the trailer to the discharge 304 of the collective single conveyor.

In the illustrated arrangement the second conveyor comprises a conventional type conveyor belt 301 supported on conventional rollers 307, 308 carried at inlet and discharge ends of the second conveyor. One of these rollers may be a drive roller and the other may be an idler. There are also provided a number of belt guide members for guiding the conveyor belt along an appropriate path between the end rollers.

An outer body 309 of the second conveyor may have an opening in the top of the outer body at the inlet end so as to form the inlet 303 of the second conveyor. The discharge 112 of the first conveyor thus positioned over top of the second conveyor's inlet 303 may then readily feed the second conveyor.

The swiveling movement of the second conveyor is afforded by for example a rotatable base 310 carried at the intermediary location with upstanding coupling ears at diametrically opposite locations on the rotatable base for removably connecting to the second conveyor. The rotatable base may also include ports 311 (shown schematically) which supply to the intermediary location IL for use by the second conveyor the power from the motor arrangement M. Additionally, the second conveyor is also inclined so as to extend upwardly and there also may be provided an upright hydraulic arm 312 (shown schematically) pivotally mounted to the rotatable base at a fixed location thereon and to a bottom of the second conveyor for raising and lowering the second conveyor relative to the horizontal or the trailer axis T.

By this swiveling movement the second conveyor may be used to locate angularly of the trailer 4 a discharge location of the particulate material. That is, the particulate material is dischargeable by the second conveyor at different locations angularly of the trailer axis T in a horizontal plane containing the trailer axis.

As the second conveyor may extend considerably beyond the periphery of the trailer in a working position where the second conveyor is arranged to discharge the particulate material in a manner completing the unloading operation, the second conveyor 30 is movable into a transport position where the second conveyor lies within the periphery of the trailer so as to be better suited for transportation.

In the transport position, the second conveyor 30 is supported in horizontal orientation above the inclined section 111 of the first conveyor on a framework 32 which thus forms a rack. The framework comprises upstanding members 322 supported on the rear frame 28 and horizontally extending cross-members 324, 325 for bracing the rack. Furthermore, the rack and outer body of the second conveyor include cooperative fasteners for securing the second conveyor to the rack framework in the transport position of the second conveyor. The rack may also be removable so as to not interfere with the swiveling movement of the second conveyor during operation in the working position.

The second conveyor may be movable between the transport position and the working position by hydraulic arms pivotal about a horizontal folding axis F which is transverse to the trailer axis T. Hydraulic arms 328 effecting this pivotal movement between the transport and working position may be provided on the rack framework 32, for example pivotally attached to one of an upstanding member 322 and a cross-member 324, to move the second conveyor from its horizontal orientation in the transport position to its inclined orientation extending from the rotatable base 310. Once the second conveyor is secured in the rotatable base, the hydraulic arms 328 may be detached and removed from the trailer together with the framework so as to not impede the swiveling movement of the second conveyor. In the figures where shown the hydraulic arms 328 are illustrated in a ready position but detached from the second conveyor.

As such, the portable drive-over conveyor 1 may by itself be operated so as to unload two or more trucks side by side. The second conveyor may be swiveled about the upstanding axis U so as to control a location where the particulate material is discharged by the drive-over conveyor.

The portable drive-over conveyor 1 may also be operated in conjunction with another such drive-over conveyor to operate in parallel to unload one or more trucks having multiple discharges.

In this parallel operation, the pair of portable drive-over conveyors are arranged side by side in spaced parallel relation such that one of the sides 17 (or 18) of a first one of the portable drive-over conveyors is facing one of the sides of a second one of the portable drive-over conveyors. Typically, the drive-over conveyor are spaced apart so that a distance between their inlets 211 is in the order of spacing between the discharges of the truck.

One of the ramp assemblies 12 (or 13) of each portable drive-over conveyor is then positioned in an overlapping configuration with one ramp assembly disposed on top of the other so as to form a bridge B allowing a truck wheel to cross from the center frame structure 11 of one portable drive-over conveyor to the other.

Thus, a truck may move from a surface such as the ground or a roadway onto one of the ramp assemblies of the first drive-over conveyor and pass over its center frame structure 11 across the bridge B and over the center frame structure of the second drive-over conveyor and down onto the ramp assembly on the other side of the second drive-over conveyor thereby positioning two unload points of the truck each over one inlet of each portable drive-over conveyor for discharging the particulate material to the conveyors.

Depending on the distance between the two drive-over conveyors, the overlapping ramp assemblies may define a bridge which is rectangular in cross-section where the bottom wall 136 of the upper ramp member 131U lies flush against the upper surface 135 of the lower ramp member 131L. The truck wheel thus only engages one of the ramp members as the truck crosses the bridge B. However, it will be appreciated that in the overlapping configuration the ramp members may define in cross-section of the bridge another polygon where the upper surface 135 of the ramp member of each drive-over conveyor defines an upper crossing surface of the bridge B between the center frame structures 11.

Thus, in the illustrated arrangement the upper ramp member 131U is rested on the lower ramp member 131L which is resting on the ground. This may reduce stress on the pivotal axis 181 about which the ramp assemblies move from the raised position to the operating position when the truck crosses the bridge.

Furthermore, depending on a steepness of the ramp members the lower ramp member in the overlapping configuration may extend to a position beneath the center frame structure 11 of the other drive-over conveyor. A bottom 22 of the center frame structure which is facing the ground may be shaped for example with a cut-out 221 so as to accommodate this ramp member in this position.

To further complement the parallel use, the second conveyors 30 of the pair of drive-over conveyors may be positioned so as to discharge their particulate material to a common location, such as the illustrated hopper bin H, from which the particulate material may be conveyed to another location further downstream of the direct unloading operation performed by the drive-over conveyors. Thus, the second conveyors may be angled from their respective trailer axes T towards one another so as to discharge to the common location. This is afforded by the swiveling movement of the second conveyors about their upstanding axes U.

The second conveyors may also be arranged by positioning in the appropriate angular orientation for discharging the contents of a single truck to different locations.

Additionally, it will be appreciated that in other arrangement there may be a different number of wheel and axle assemblies, for example three. The particular number of wheel and axle assemblies used from one arrangement to another may vary depending on a net dry weight of the portable drive-over conveyor.

FIGS. 18 to 24 illustrate a second arrangement of portable drive-over conveyor indicated at 1' which is substantially similar to that illustrated in the other figures but includes additional features which will be described in further detail below. Those features which are substantially in common with the first arrangement of FIGS. 1 to 17 are not discussed hereinafter.

First and second ramp assemblies 12, 13 of the portable drive-over conveyor 1' comprise ramp members each with a first ramp section 130A which defines the outer end of the ramp member (generally indicated at 138) that is coupled at a joint 130B to a second ramp section 130C pivotally connected at the respective side 17, 18 of the center frame structure 11. At the joint 130B the first ramp section is pivotally movable relative to the second ramp section through a fairly small angular arc about a longitudinal axis R which is parallel to that axis 181 at the respective side of the center frame structure.

At this joint an end 141 of the first ramp section 130A which is proximal to the second ramp section 130C forms a surface which is generally arcuate curving convexly of the first ramp section so that from the upper surface 135 of the ramp member at the first section 130A the surface 141 extends towards a bottom of the ramp member generally indicated at 136 and outwardly towards the second ramp section on path to a central apex 143 of the surface 141 wherefrom this surface then extends away from the second ramp section and towards the bottom 136.

Further to the arcuate surface 141, an end 145 of the second ramp section at the joint 130B and thus proximal to the first ramp section 130A forms a stepped surface comprising a first portion 146A adjacent the upper surface 135; a recessed second portion 146B distal to the upper surface and adjacent the bottom 136; and an inclined portion 146C where the first portion transitions to the second portion. As such, the first portion 146A of the stepped surface projects outwardly from the second ramp section, that is in a direction towards the first ramp section 130A, beyond the second portion 146B so as to be closer to the end 141 of the first ramp section than the second portion 146B is thereto, yet still be spaced therefrom. Further the transition or step at 146C in the stepped surface is offset from a central location on the second ramp section's end 145 that is opposite and corresponding to the location of the apex 143 on the first ramp section's end 141. As such, the transition is closer to the upper surface 135 than to the bottom of the second ramp section and thus not located halfway therebetween.

As such, relative to an angularly neutral position of the first ramp section 130A relative to the second ramp section 130C when the ramp member bottom 136 at each ramp section follows a linear path from one to the other such that the two ramp sections are linearly in-line as demonstrated for example in FIG. 7, the first portion 146A of the stepped surface acts to form a smaller pivotal range of movement from this angularly neutral position than that provided by the second portion 146B of the stepped surface. Thus from a reference defined by this angularly neutral position the first ramp section pivots through a larger arc in an 'over-extending' direction indicated by arrow OE than in a 'inwardly curling' direction indicated by arrow CU.

The pivot axis R of the joint 130B is located further outwardly from the center frame structure 11 than the end 141 of the first ramp section at the joint. The pivot axis is defined at ears projecting from the end 145 of the second section 130B that is distal to the center frame structure with a single rod or plurality of pins located thereat received in sleeve(s) located between the upper surface 135 and the bottom of the first ramp section.

Turning our attention now to the inlets, at each inlet 211 of the second arrangement there is provided a chute 2121 which is substantially similar to the funnel structure 2111 illustrated and described in more detail hereinbefore. The chute 2121 has an open top 2123A which is liftable to a raised position in which the top is spaced above the upper surface 21 of the center frame structure so as to capture and guide onto the conveyor the particulate material discharged thereon at a location spaced above the upper surface 21 of the center frame structure.

The chute 2121 comprises a lift mechanism for lifting the top 2123A of the chute that includes a hydraulic cylinder actuator 2124 operatively connected via scissor-style linkage 2125 to a frame 2126 supporting a collapsible chute body 2127 which spans from the top of the chute to a bottom thereof at the upper surface of the center frame structure. The actuator 2124 is arranged to one side of the center frame structure, specifically that at 18 in the illustrated arrangement, between the ramp members 131, 132 which are on either side of the respective inlet such that the top 2123A of the chute can be lowered to a position at the upper surface 21 of the center frame structure. This minimizes a height of the center frame structure to prevent the respective dump truck with trailer or container from which the particulate material is unloaded from grounding or bottoming out on the center frame structure 11 as the truck is positioned for unloading.

The frame 2126 of the chute 2121 includes an annular base portion 2126A which is coupled in fixed relation to the center frame structure 11 at longitudinal beams 19' and 20' thereof in a position bridging the beams over top the first conveyor 26. An annular top portion 2126B of the frame defines the top 2123A of the chute, and the chute body 2127 which comprises a suitable material which can fold is attached at one end to the top portion 2126B and at the other end to the base portion 2126A. The two portions of the frame 2126A and 2126B are movably interconnected for upward and downward movement by the linkage 2125 which includes both in front and to the rear of the frame a pair of elongate arms 21252 and 21253 pivotally connected to one another at an intermediary point I along their lengths. One end of each arm is slidably coupled to the respective frame portion at a track in a pin 21255 and slot 21263 arrangement. A drive arm 21252 is connected between the top frame portion 2126B and the actuator 2124, and a guide arm 21253 is pivotally connected in fixed location to the top frame portion 2126B and slidably connected to the base frame portion 2126A. The drive arm 21252 extends to a pivot point H at the side 18 of the center frame structure, wherefrom a linking arm 21255 extends to a rod end 2124A of the cylinder actuator 2124. The linking arm 21255 and drive arm 21252 are connected in fixed relation to one another at the pivot point H, which is defined by for example by a rod 21257 extending longitudinally of the side of the center frame structure and supported thereat by apertures in an actuator housing 2128 attached to the side of the center frame. Both the linking arm and the drive arm are fixedly attached to the rod 21257. At a drive end 21255A the linking arm is pivotally coupled to the rod end 2124A of the actuator arranged so that in a retracting direction of operation the chute top 2123A is lowered towards the upper surface 21 and in an extending direction of operation the chute top is raised upwardly towards a discharge of a truck/trailer that is positioned over top. A pump 21243 delivers hydraulic fluid to a barrel end of the hydraulic cylinder actuator so as to drive extension of the actuator. Weight of the top frame portion 2126B and the drive arm may be used to effect retraction of the actuator such that the cylinder may be of the single-acting variety while still being able to achieve the raising and lowering of the chute.

The top portion 2126B is sized diametrically larger than the base portion 2126A of the frame, and the guide arm 21253 is located inwardly of the drive arm 21252 which is located inwardly of the periphery of the top frame portion 2126B so that in the lowered position the frame 2126 and linkage 2125 forms a nested configuration minimizing a height that the top 2123A of the chute protrudes above the upper surface 21 of the center frame structure.

Further to the chute, at the respective inlet there is provided a cover 2130 spanning across the inlet opening 211 with a set of apertures 2132 thereby forming a grate, and a component 2135 cooperative with the cover to close the apertures 2132 in the cover for preventing the particulate material from falling onto the first conveyor 26. The component which is disposed beneath the cover comprises a sheet 2137 with a set of apertures 2138 matching that of the cover. Thus the component is positionable such that the apertures 2138 therein are misaligned relative to the apertures 2132 of the cover thereby preventing the particulate material from falling onto the first conveyor.

The cover 2130 between respective ones of each adjacent pair of the apertures 2132 comprises a pair of inclined surfaces 2141, 2142 meeting at a tip 2144 spaced above the adjacent apertures such that the inclined surfaces act to guide the particulate material into one of the apertures so that when the apertures of the cover and of the component are misaligned to allow passage of material the cover resists unwantedly catching particulate material on its path past the cover onto the first conveyor.

The perforated sheet 2137 located beneath the upper surface 21 formed by tops of the longitudinal I-beams 19', 20' is slidably movable between aligned and misaligned positions by hand lever or by a hydraulic cylinder actuator 2146 translating the sheet horizontally between these two positions. Main portions 19'A, 20'A of the longitudinal I-beams 19', 20' are spaced apart such that there is sufficient space between each beam main portion and edges of the perforated sheet 2137 so that the sheet can be displaced to the misaligned position to block the apertures 2132 in the cover.

Also there is provided on either side of the cover 2130 at a position adjacent the respective longitudinal beam a guide flange 2148 extending downwardly and inwardly towards a center of the first conveyor 26 so as to guide the discharged particulate material centrally onto the first conveyor. Each flange 2148 is supported at a location beneath the perforated sheet 2137 by for example a pair of depending arms 2149A attached to the base frame portion 2126A, one in front and the other at the rear, so as to hold the respective flange 2148 suspended in proper orientation beneath the sheet 2137.

Between respective ones of each adjacent pair of inlets 211 is provided an upstanding partition wall 2150 which in a more marked manner delimits lanes of the drive-over conveyor such as L1, L2, and L3 each corresponding to the respective inlet for receiving one of the trucks. Each lane L1, L2, or L3 is defined transversely of the center frame structure and includes the ramp members 131, 132 on either side of the corresponding inlet 211, that is in front thereof and to the rear thereof, and the upper surface 21 of the center frame structure so as to span across the center frame structure from the end 138 of the ramp assembly 13 on one side of the center frame structure to that on the other side.

Each partition wall 2150 stands upwardly from the upper surface 21 of the center frame structure such that a top 2152A of the partition wall is spaced thereabove. In the illustrated arrangement the wall top 2152A is located below a height of the platform 292. On either side of the partition wall is provided a light 2155 arranged to illuminate an area of the upper surface 21 of the center frame structure including a respective one of said each adjacent pair of the inlets 211. This allows unloading operations to be performed safely when it is dark around the portable drive-over conveyor. It will be appreciated that at front-most and rearmost ones of the inlets 211A and 211C there is a light 2156 arranged in a wall 2157, 2158 in opposite relation to the nearest partition wall so as to aid in illuminating the respective one of the lanes, thereby also providing at the front-most and rearmost inlets a pair of the lights for illuminating a single one of the lanes.

Further to illumination of the upper surface 21 of the center frame structure, the portable drive-over conveyor also includes a light pole 40 which is pivotally movable about a horizontal transverse axis PA from a transport position in which the pole 40 is horizontally oriented so as to be adjacent the center frame structure to a working position in which the light pole is upstanding therefrom using hydraulic actuators (not shown) operatively coupled between the pole and a fixed base. The light pole 40 has a light supported thereon at a spaced location from the base. In the illustrated arrangement the light pole 40 at its base is disposed on the trailer in an intermediate location rearwardly of the rearmost one 211C of the inlets and forwardly of the rear 8B of the trailer so as to provide general illumination of an area of and about the portable drive-over conveyor.

In front of and to the rear of each inlet 211 the upper surface 21 of the center frame structure is formed by a plate 2160 spanning transversely of the center frame from an edge 2162A in a position at or adjacent one of the left and right sides 17, 18 to an opposing edge 2162B in a position at or adjacent the other one of the left and right sides. Each plate 2160 also spans longitudinally of the center frame structure from one of the partition walls 2150 to the chute/cover at the inlet 211. Therefore the upper surface 21 is formed by a plurality of the plates, which are removable, with one on either side of the respective inlet and the respective partition wall. The plates are removably fastened by bolts to the longitudinal beams 19', 20' of the center frame structure 11 so as to be in position over the first conveyor 26. As such, the first conveyor 26 thus located beneath the upper surface 21 of the center frame structure is easily accessible for example for maintenance or repair purposes. That portion of the upper surface 21 spanning from the edges of the plates which are adjacent the sides of the center frame structure to the ramp assemblies is formed by tops of the longitudinal beams 19', 20' of the center frame structure which span the full length of the center frame between the front frame component 29 and the rear frame 28.

Turning now in more detail to the conveyors of the portable drive-over conveyor 1', the inlet 303 of the second conveyor includes an circular annular wall 330 of flexible material standing upwardly from the outer body 309 enclosing the conveyor belt 301 so as to delimit an opening 332A through which the particulate material is fed to the second conveyor. Furthermore, the discharge 112 of the first conveyor 26 includes an inner circular annular wall 114 depending from an outer body 116 of the inclined section 111 so as to delimit an opening 117A through which the particulate material is discharged and additionally an outer annular wall 119 of flexible material depending from the inclined section's outer body 114 at a location thereon radially outwardly of the inner annular wall. The first conveyor's depending walls 114, 119 receive therebetween the annular wall 330 of the inlet of the second conveyor 30 when the discharge 112 of the first conveyor is positioned over the inlet 303 of the second conveyor thereby forming a seal at the intermediary location IL. The outer annular wall 119 of the first conveyor portion acts to cover the intermediary location IL during exchange of the particulate material between the first and second conveyors 26, 30 so as to reduce propagation of dust therefrom that otherwise may lead to diseases such as silicosis in users/operators of the portable drive-over conveyors.

Figure 29:
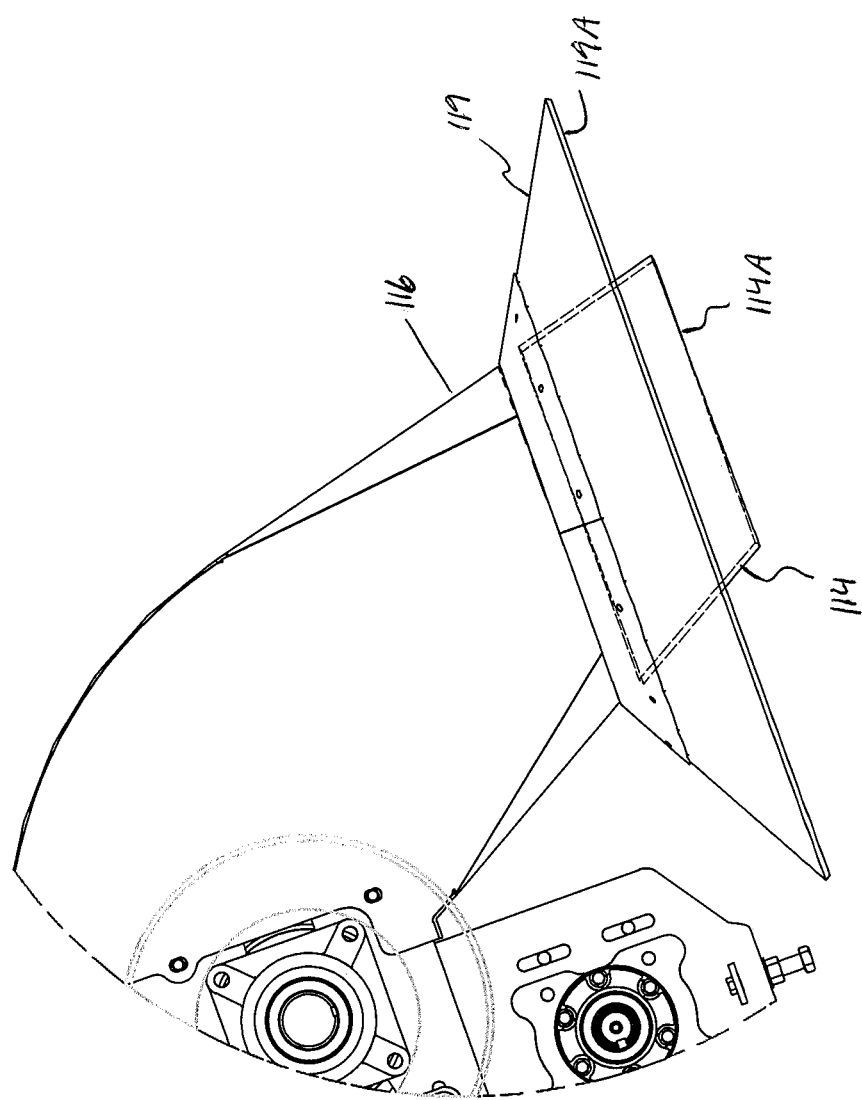
FIG. 29 is a cross-sectional view along line 29-29 in FIG. 23.

As can be more clearly seen in FIG. 29 the outer annular wall 119 diverges from its affixed edge to its free edge 119A such that the free edge is spaced further from a free edge 114A of the inner wall than the affixed edge at the outer body 116 is from an affixed edge of the inner wall 114.

In the second arrangement of drive-over conveyor the second conveyor is supported by a framework 32' from which the second conveyor is suspended in inclined orientation with its inlet 303 at the intermediary location beneath the discharge 112 of the first conveyor. The framework comprises a top portion 32'A forming a pair of arms each one of which is attached on either side of the outer body 309 at a location closer to the inlet 303 than the discharge 304 of the second conveyor; an intermediary portion 32'B; and a bottom portion 32'C each adjacent pair of which is connected at one of two folding axes F1 and F2 with appropriate actuators, such as hydraulic cylinders, for displacing the second conveyor in pivotal movement about the respective one of the folding axes for positioning the inlet 303 of the second conveyor at the intermediary location IL in two stages of such pivotal movement. The bottom portion 32'C of the framework forming a pair of rails 3303 and 3304 each one of which extends rearwardly on either side of the inclined section 111 with a carrier 3306 displaceable longitudinally along the rails by for example a hydraulic actuator operatively coupled between the carrier and bases of the rails. The carrier 3306 supports the upstanding axis U at which the intermediary portion 32'B attaches thereto for pivotal movement of the second conveyor 30 to position the discharge to either side of the trailer axis T, as discussed previously.

The first and second conveyors 26, 30 are operated using a controller in the form of a computerized control panel 50 mounted rearwardly of the rearmost inlet 211C and thus located intermediate same and the discharge of the conveyor, which in the illustrated arrangement is defined by the discharge 304 of the second conveyor. As such, from location of the controller 50 which is affixed in location both the discharge of the conveyor at 304 and the center frame structure 11 locating the inlets are visible to an operator positioned in front of the control panel.

Figure 30:
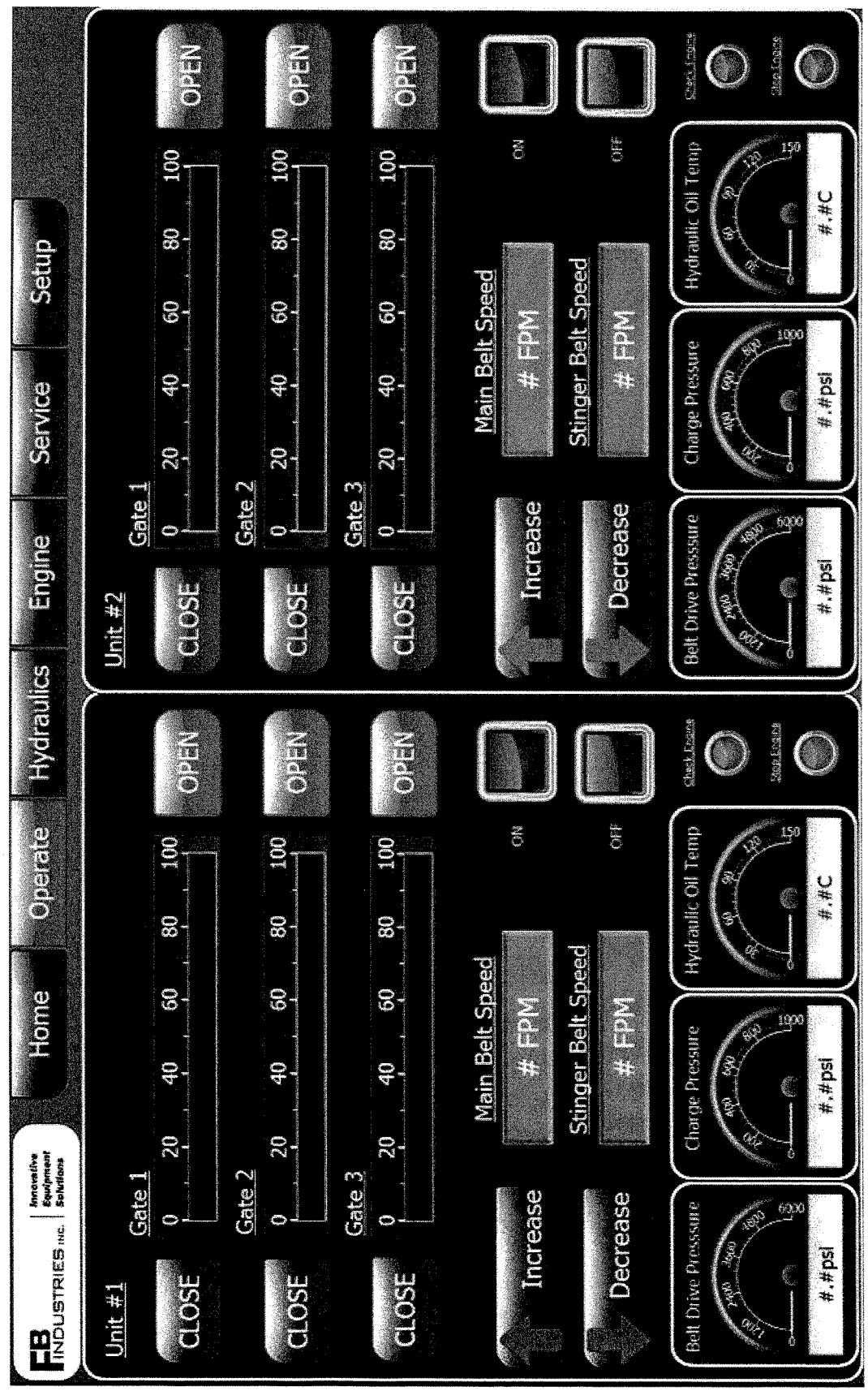
FIG. 30 is a screen shot showing a display of a control panel of the second arrangement portable drive-over conveyor.

At the control panel 50 various metrics of the portable drive-over conveyor can be controlled and monitored as illustrated in FIG. 30 which show example screen shots of the control panel. Thus, for example as in FIG. 30 position of the component 2135 relative to the cover 2130 may be controlled so as to meter the input of particulate material to the first conveyor 26 by controlling an effective size of the apertures 2132 in the cover (that is, that size of cover apertures which are unobstructed by the component). Additionally, it is possible to adjust independently of one another a speed of the belt of each of the first conveyor 26 referred to in FIG. 30 as 'main conveyor' and the second conveyor 30 referred to in FIG. 30 as 'stinger conveyor'.

When at least two portable drive-over conveyors are operated cooperatively in the form of system S the controllers 50 thereof may be operatively coupled so that the conveyors of the constituent portable drive-over conveyors are operated from the controller of only one of the portable drive-over conveyors. In the illustrated arrangement the controllers are configured to be operatively coupled for operation from one control panel via a cable 60 (shown schematically) connected between the control panels 50. This allows for a single operator positioned in a safe location at one of the portable drive-over conveyors to operate multiple conveyors. The cable transfers those signals required to operate the control panel of the second drive-over conveyor from the "master" control panel at which the operator is stationed. The cable uses a pin-and-socket style of connection on either end thereof with ports of the control panels (not shown). That is, on either end of the cable is a connector with sockets for accepting pins of a port on the respective control panel.

It will also be appreciated that the gas bags forming the suspension of the wheel and axle assemblies are oversized so as to provide raising and lowering of the center frame structure 11 from a transport height in which the bottom 22 of the center frame structure is raised above the ground to a lowered position in which the center frame structure is rested on the ground.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A portable drive-over conveyor for unloading particulate material from two or more trucks comprising:

a trailer comprising a frame structure with front and rear ends opposite one another on a trailer axis and first and second sides spanning between the front and rear ends longitudinally of said trailer axis where the front end, rear end, first side, and second side collectively define a periphery of the frame structure;

the trailer comprising a hitch coupling supported at the front end of the frame structure for coupling to a towing vehicle;

the trailer comprising a plurality of wheels rotatably coupled at the rear end of the frame structure such that the trailer is towable across a support surface by the towing vehicle;

a conveyor carried by the frame structure and extending longitudinally of the trailer axis from one end to another end of the trailer;

the conveyor being arranged to transport particulate material to a discharge at one end of the trailer;

a first ramp assembly mounted on the first side for pivotal movement about an axis longitudinal of the first side such that the first ramp assembly is positionable in a manner extending outwardly from the first side to define a ramp allowing a truck wheel to move onto the frame structure from another surface;

a second ramp assembly mounted on the second side for pivotal movement about an axis longitudinal of the second side such that the second ramp assembly is positionable in a manner extending outwardly from the second side to define a ramp allowing a truck wheel to move onto the frame structure from another surface;

the ramp assemblies and the frame structure providing upper surfaces for supporting the two or more trucks as the two or more trucks pass from the first ramp assembly over the frame structure and onto the second ramp assembly, wherein the ramp assemblies each comprise a first ramp member and a second ramp member;

the upper surface of the frame structure comprising a plurality of inlets at longitudinally spaced positions of the frame structure for passage of the particulate material discharged thereon through the upper surface to the conveyor, wherein at least one inlet of the plurality of inlets comprises a cover spanning thereacross with apertures and a component comprising a sheet with a set of apertures matching the apertures of the cover, and wherein the sheet is positionable to be misaligned relative to the apertures of the cover to prevent the particulate material from falling onto the conveyor.

2. The portable drive-over conveyor according to claim 1 further comprising a partition wall upstanding from the upper surface of the frame structure between respective ones of each adjacent pair of the inlets such that the upper surface of the frame structure is divided into separate lanes each for receiving one of the one or more trucks.

3. The portable drive-over conveyor according to claim 2 wherein the partition wall further comprises a light on either side of the partition wall, wherein the light is arranged to illuminate an area of the upper surface of the frame structure comprising a respective one of said each adjacent pair of the inlets.

4. The portable drive-over conveyor according to claim 1 wherein the conveyor comprises a first conveyor portion fed by at least one inlet of the plurality of inlets and extending rearwardly past said at least one inlet to an intermediary location, and a second conveyor portion extending from the intermediary location to the discharge of the conveyor.

5. The portable drive-over conveyor according to claim 4 wherein the second conveyor portion is fed by the first conveyor portion at the intermediary location via a discharge of the first conveyor portion positionable over an inlet of the second conveyor portion.

6. The portable drive-over conveyor according to claim 5 wherein the inlet of the second conveyor portion comprises an upstanding annular wall delimiting an opening through which the particulate material is fed and the discharge of the first conveyor portion comprises a depending inner annular wall delimiting an opening through which the particulate material is discharged and a depending outer annular wall spaced radially outwardly of the inner annular wall receiving therebetween the annular wall of the inlet of the second conveyor portion when said discharge is positioned over said inlet thereby forming a seal at the intermediary location.

7. The portable drive-over conveyor according to claim 4 wherein the second conveyor portion is swivably coupled to the frame structure to be swivably movable about an upstanding axis such that the discharge of the conveyor can be positionable to either side of the trailer axis.

8. The portable drive-over conveyor according to claim 4 wherein the second conveyor portion is positionable in a working position where the discharge of the conveyor is located beyond the periphery of the trailer and in a transport position where the second conveyor portion lies within the periphery of the trailer.

9. The portable drive-over conveyor according to claim 8 wherein in the transport position the second conveyor portion is disposed above the first conveyor portion where the second conveyor portion is inoperable for receiving the particulate material transferred by the first conveyor portion.

10. The portable drive-over conveyor according to claim 1 wherein said at least one inlet comprises a chute with a top which is liftable to a position above the upper surface of the frame structure to capture and guide onto the conveyor the particulate material discharged at a location above the upper surface of the frame structure.

11. The portable drive-over conveyor according to claim 10 wherein the chute comprises an actuator coupled to the top of the chute for lifting the top of the chute and the actuator is arranged to one side of the top of the chute such that the top of the chute is lowerable to a position at the upper surface of the frame structure.

12. The portable drive-over conveyor according to claim 1 wherein the cover comprises a pair of inclined surfaces between adjacent apertures meeting at a tip above the apertures such that the inclined surfaces guide the particulate material into one of the apertures.

13. The portable drive-over conveyor according to claim 1 wherein at least one of the first and the second ramp assemblies comprises a ramp member with a first ramp section defining an outer end of the ramp member that is pivotally coupled at a joint to a second ramp section pivotally connected to the frame structure such that at the joint the first ramp section is pivotal relative to the second ramp section about an axis parallel to that which is longitudinal of a respective one of the sides of the frame structure.

14. The portable drive-over conveyor according to claim 13 wherein the first ramp section comprises an arcuate surface at the joint that is curved convexly of the first ramp section.

15. The portable drive-over conveyor according to claim 13 wherein the second ramp section comprises a stepped surface at the joint for abutting an end of the first ramp section opposite that defining the outer end of the ramp member where a first portion of the stepped surface adjacent the upper surface of the respective one of at least one of the first and second ramp assemblies is projecting beyond a second portion distal to said upper surface.

16. The portable drive-over conveyor according to claim 1 further comprising a light pole which is movable from a transport position in which the light pole is horizontally oriented adjacent the frame structure to a working position in which the light pole is upstanding therefrom.

17. The portable drive-over conveyor according to claim 1 wherein the upper surface of the frame structure is formed by a plurality of plates spanning across the frame structure from a position at or adjacent one of the first and the second sides of the frame structure to a position at or adjacent the other one of the first and second sides.

18. The portable drive-over conveyor according to claim 1, wherein the first and second ramp members are arranged in spaced configuration in front of and to the rear of each inlet, and the first member of the first ramp assembly and the first ramp member of the second ramp assembly immediately adjacent to one another are unitary.

19. A method for unloading particulate material from trucks having a plurality of discharges at longitudinally spaced positions therealong comprising:

providing at least two portable drive-over conveyors respectively comprising: a trailer comprising a center frame structure with forward and rearward ends and first and second sides;

the trailer comprising a hitch coupling arranged at the forward end of the center frame structure for coupling to a towing vehicle;

the trailer comprising a wheel and axle assembly arranged at the rearward end such that the trailer is towable across a support surface by the towing vehicle;

a first ramp assembly mounted on the first side for pivotal movement about an axis longitudinal of the first side such that the first ramp assembly is positionable in a manner extending outwardly from the first side to define a ramp allowing a truck wheel to move onto the center frame structure from another surface;

a second ramp assembly mounted on the second side for pivotal movement about an axis longitudinal of the second side such that the second ramp assembly is positionable in a manner extending outwardly from the second side to define a ramp allowing a truck wheel to move onto the center frame structure from another surface;

a conveyor arranged along the center frame structure and arranged to transport the particulate material longitudinally along the trailer to a discharge at one end of the center frame structure;

the ramp assemblies and the center frame structure providing upper surfaces for supporting the truck as it passes from the first ramp assembly over the center frame structure and onto the second ramp assembly;

the upper surface of the center frame structure having an inlet for passage of the particulate material discharged thereon through the upper surface to the conveyor;

arranging said at least two portable drive-over conveyors such that one of the sides of a first one of the portable drive-over conveyors is facing one of the sides of a second one of the portable drive-over conveyors;

positioning one of the ramp assemblies of each of the portable drive-over conveyors in an overlapping configuration with one ramp assembly disposed on top of the other so as to form a bridge allowing a truck wheel to cross from the center frame structure of one portable drive-over conveyor to the other;

arranging a truck to pass over said at least two portable drive-over conveyors such that respective discharges of the truck are arranged over the inlet of each portable drive-over conveyor for discharging the particulate material to the conveyors; and transporting the particulate material along the conveyors to another location beyond the portable drive-over conveyors; wherein each portable drive-over conveyor comprises a controller for controlling operation of the conveyor, and wherein the controllers of said at least two portable drive-over conveyors are operatively coupled so that the conveyors of said at least two portable drive-over conveyors are operated from the controller of one of said at least two portable drive-over conveyors in the step of transporting the particulate material along the conveyors.

* * * * *